US012615332B2

(12) United States Patent
Bhullar

(10) Patent No.: US 12,615,332 B2
(45) Date of Patent: Apr. 28, 2026

(54) REMINDERS TECHNIQUES ON A USER DEVICE

(71) Applicant: Apple Inc., Cupertino, CA (US)

(72) Inventor: Bicrumjit S. Bhullar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/189,986

(22) Filed: Mar. 24, 2023

(65) Prior Publication Data

US 2023/0239395 A1 Jul. 27, 2023

Related U.S. Application Data

(63) Continuation of application No. 16/789,080, filed on Feb. 12, 2020, now abandoned.

(Continued)

(51) Int. Cl.
| | |
|---|---|
| *G06F 3/048* | (2013.01) |
| *G06F 1/16* | (2006.01) |
| *G06F 3/0481* | (2022.01) |
| *G06F 3/04817* | (2022.01) |
| *G06F 3/0484* | (2022.01) |
| *G06Q 10/1093* | (2023.01) |

(Continued)

(52) U.S. Cl.
CPC ........ *H04M 1/72484* (2021.01); *G06F 1/163* (2013.01); *G06F 3/0481* (2013.01); *G06F 3/04817* (2013.01); *G06F 3/0484* (2013.01); *G06Q 10/1093* (2013.01); *H04M 1/72412* (2021.01); *H04M 1/72451* (2021.01); *H04M 1/72469* (2021.01); *H04W 4/12* (2013.01)

(58) Field of Classification Search
CPC ......... H04M 1/72484; H04M 1/72412; H04M 1/72469; H04M 1/72451; H04W 4/12; G06F 1/163; G06F 3/0481; G06F 3/04817; G06F 3/0484
See application file for complete search history.

(56) References Cited

U.S. PATENT DOCUMENTS

| | | |
|---|---|---|
| 6,850,837 B2 | 2/2005 | Paulauskas et al. |
| 8,639,552 B1 | 1/2014 | Chen et al. |

(Continued)

FOREIGN PATENT DOCUMENTS

| | | |
|---|---|---|
| CN | 103093335 A | 5/2013 |
| CN | 103440571 A | 12/2013 |

(Continued)

OTHER PUBLICATIONS

The U.S. Appl. No. 16/015,076, "Final Office Action," mailed Mar. 10, 2021, 41 pages.

(Continued)

*Primary Examiner* — Mahelet Shiberou
(74) *Attorney, Agent, or Firm* — BAKERHOSTETLER; Kyle B. Morse

(57) ABSTRACT

Embodiments of the present disclosure are directed to, among other things, generating reminders based on information from applications. For example, triggering events such as other users and/or locations can be used to configure reminders. Additionally, in some examples, reminders can be generated based at least in part on user interaction with an application, where state information can be saved and associated with the reminders.

20 Claims, 19 Drawing Sheets

Related U.S. Application Data

(60) Provisional application No. 62/855,760, filed on May 31, 2019, provisional application No. 62/834,881, filed on Apr. 16, 2019.

(51) Int. Cl.

| | | |
|---|---|---|
| *H04M 1/72412* | (2021.01) | |
| *H04M 1/72451* | (2021.01) | |
| *H04M 1/72469* | (2021.01) | |
| *H04M 1/72484* | (2021.01) | |
| *H04W 4/12* | (2009.01) | |

(56) References Cited

U.S. PATENT DOCUMENTS

| | | | |
|---|---|---|---|
| 8,812,958 B2 | 8/2014 | Willis et al. | |
| 9,679,078 B2 | 6/2017 | Vora et al. | |
| 9,750,084 B2* | 8/2017 | Li | H04W 4/14 |
| 9,876,751 B2 | 1/2018 | Spivack et al. | |
| 9,922,169 B1 | 3/2018 | Candy | |
| 10,447,723 B2 | 10/2019 | Miller | |
| 10,671,947 B2 | 6/2020 | Nayar et al. | |
| 11,064,068 B2 | 7/2021 | Bhullar | |
| 11,372,696 B2 | 6/2022 | Berget et al. | |
| 2007/0111712 A1 | 5/2007 | Ratnakar | |
| 2008/0169937 A1 | 7/2008 | Lowry | |
| 2010/0184484 A1 | 7/2010 | Lindberg et al. | |
| 2010/0273447 A1 | 10/2010 | Mann et al. | |
| 2011/0145823 A1 | 6/2011 | Rowe et al. | |
| 2011/0148632 A1 | 6/2011 | Chin | |
| 2011/0314404 A1 | 12/2011 | Kotler et al. | |
| 2012/0129510 A1* | 5/2012 | Bradburn | H04M 3/42127 |
| | | | 455/418 |
| 2013/0066944 A1 | 3/2013 | Laredo et al. | |
| 2013/0217366 A1 | 8/2013 | Kolodziej | |
| 2013/0226816 A1 | 8/2013 | Chory et al. | |
| 2013/0329527 A1 | 12/2013 | Alavala et al. | |
| 2014/0033071 A1 | 1/2014 | Gruber et al. | |
| 2014/0080106 A1 | 3/2014 | Falchuk et al. | |
| 2014/0081691 A1 | 3/2014 | Wendell | |
| 2014/0135036 A1* | 5/2014 | Bonanni | H04W 4/023 |
| | | | 455/456.3 |
| 2014/0297743 A1 | 10/2014 | Zyto et al. | |
| 2014/0297758 A1 | 10/2014 | Kidron et al. | |
| 2014/0335490 A1 | 11/2014 | Baarman et al. | |
| 2014/0372896 A1 | 12/2014 | Raman | |
| 2015/0033138 A1 | 1/2015 | Manchanda | |
| 2015/0127565 A1 | 5/2015 | Chevalier et al. | |
| 2015/0143281 A1 | 5/2015 | Mehta et al. | |
| 2015/0187201 A1 | 7/2015 | Yuksel et al. | |
| 2015/0193392 A1 | 7/2015 | Greenblatt et al. | |
| 2015/0207926 A1* | 7/2015 | Brown | H04L 51/046 |
| | | | 455/414.1 |
| 2015/0236598 A1 | 8/2015 | Krueger et al. | |
| 2015/0237598 A1 | 8/2015 | Yoshitomi et al. | |
| 2015/0241903 A1 | 8/2015 | Sonmez | |
| 2015/0341903 A1* | 11/2015 | Jeong | H04M 1/72412 |
| | | | 455/458 |
| 2016/0094979 A1* | 3/2016 | Naik | H04M 3/42348 |
| | | | 455/414.1 |
| 2016/0110012 A1 | 4/2016 | Mm et al. | |
| 2016/0224946 A1 | 8/2016 | Vemuri et al. | |
| 2016/0300178 A1 | 10/2016 | Perry et al. | |
| 2016/0337295 A1 | 11/2016 | Bennett et al. | |
| 2016/0345132 A1 | 11/2016 | Creighton et al. | |
| 2016/0349953 A1 | 12/2016 | Adler et al. | |
| 2016/0360382 A1 | 12/2016 | Gross et al. | |
| 2017/0004396 A1 | 1/2017 | Ghotbi et al. | |
| 2017/0091717 A1 | 3/2017 | Chandraghatgi et al. | |
| 2017/0118348 A1 | 4/2017 | Dotan-Cohen et al. | |
| 2017/0178048 A1 | 6/2017 | Ghotbi et al. | |
| 2017/0243465 A1 | 8/2017 | Bourne, Jr. et al. | |
| 2017/0286913 A1 | 10/2017 | Liu et al. | |
| 2017/0308866 A1 | 10/2017 | Dotan-Cohen et al. | |
| 2017/0346914 A1 | 11/2017 | Cheung et al. | |

| | | | |
|---|---|---|---|
| 2018/0144154 A1 | 5/2018 | Shacham et al. | |
| 2018/0218325 A1 | 8/2018 | Radhakrishnan et al. | |
| 2018/0233133 A1 | 8/2018 | Hilal et al. | |
| 2018/0253322 A1* | 9/2018 | Yang | H04M 19/047 |
| 2018/0336530 A1 | 11/2018 | Johnson et al. | |
| 2019/0020991 A1 | 1/2019 | Hamilton et al. | |
| 2019/0095846 A1 | 3/2019 | Gupta et al. | |
| 2019/0129749 A1 | 5/2019 | White et al. | |
| 2019/0220010 A1 | 7/2019 | Leonard et al. | |
| 2020/0005248 A1 | 1/2020 | Gerzi et al. | |
| 2020/0302404 A1 | 9/2020 | Shaya et al. | |
| 2020/0329004 A1* | 10/2020 | Carbune | H04L 67/535 |
| 2021/0044492 A1* | 2/2021 | Cili | H04M 1/72451 |
| 2021/0081097 A1 | 3/2021 | Jeong et al. | |

FOREIGN PATENT DOCUMENTS

| | | |
|---|---|---|
| CN | 107147810 A | 9/2017 |
| CN | 107230045 A | 10/2017 |
| CN | 107636647 A | 1/2018 |
| CN | 107835295 A | 3/2018 |
| CN | 107846508 A | 3/2018 |
| WO | 2013184334 A2 | 12/2013 |

OTHER PUBLICATIONS

The U.S. Appl. No. 16/015,076, "First Action Interview Office Action Summary," mailed Sep. 29, 2020, 8 pages.

The U.S. Appl. No. 16/015,076, "First Action Interview Pilot Program Pre-Interview Communication," Mailed Jul. 24, 2023, 6 pages.

The U.S. Appl. No. 16/015,076, "Non-Final Office Action," mailed Aug. 16, 2021, 38 pages.

The U.S. Appl. No. 16/426,565, "Advisory Action," Dec. 13, 2021, 3 pages.

The U.S. Appl. No. 16/426,565, "Advisory Action," mailed Dec. 31, 2020, 4 pages.

The U.S. Appl. No. 16/426,565, "Corrected Notice of Allowability" Apr. 4, 2022, 3 pages.

The U.S. Appl. No. 16/426,565, "Corrected Notice of Allowability" mailed May 25, 2022, 3 pages.

The U.S. Appl. No. 16/426,565, "Final Office Action" mailed Aug. 19, 2021, 16 pages.

The U.S. Appl. No. 16/426,565, "Final Office Action" mailed Nov. 12, 2020, 23 pages.

The U.S. Appl. No. 16/426,565, "Non-Final Office Action" mailed Jan. 29, 2021, 21 pages.

The U.S. Appl. No. 16/426,565, "Non-Final Office Action" mailed Apr. 20, 2020, 23 pages.

The U.S. Appl. No. 16/426,565, "Notice of Allowance" mailed Feb. 22, 2022, 11 pages.

The U.S. Appl. No. 16/788,995, "Corrected Notice of Allowability" mailed Apr. 15, 2021, 5 pages.

The U.S. Appl. No. 16/788,995, "Non-Final Office Action" mailed Oct. 13, 2020, 9 pages.

The U.S. Appl. No. 16/788,995, "Notice of Allowance" mailed Mar. 8, 2021, 10 pages.

The U.S. Appl. No. 16/788,995, "Notice of Allowance" mailed Jan. 8, 2021, 11 pages.

The U.S. Appl. No. 16/789,080, "Final Office Action" mailed Jul. 1, 2021, 16 pages.

The U.S. Appl. No. 16/789,080, "Final Office Action" mailed Sep. 27, 2022, 19 pages.

The U.S. Appl. No. 16/789,080, "Non-Final Office Action" mailed Mar. 15, 2022, 14 pages.

The U.S. Appl. No. 16/789,080, "Non-Final Office Action" mailed Jan. 6, 2021, 17 pages.

Bozzon , et al., "Choosing the Right Crowd: Expert Finding in Social Networks", Proceedings of the 16th International Conference on Extending Database Technology , Mar. 18-22, 2013, pp. 637-648.

The Chinese Application No. CN202010261448.4, "Office Action" mailed Aug. 15, 2023, 13 pages.

(56) References Cited

OTHER PUBLICATIONS

The Chinese Application No. CN202010473063.4, "Notice of Decision to Grant" mailed Apr. 22, 2022, 4 pages.
The Chinese Application No. CN202010473063.4, "Office Action" mailed Oct. 8, 2021, 10 pages.
The Chinese Application No. CN202010473063.4, "Office Action" mailed Feb. 24, 2021, 20 pages.
The European Application No. EP20722058.3, "Office Action" mailed May 19, 2023, 9 pages.
Lin , et al. , "A Location-Based Personal Task Management Application For Indoor And Outdoor Environments" , Institute of Electrical and Electronics Engineers Xplore , Sep. 1, 2012 , pp. 582-587.
Mcgee-Lennon , et al. , "Reminders that Make Sense: Designing Multi Modal Notifications for the Home", Institute of Electrical and Electronics Engineers Xplore , Jun. 2011 , 7 pages.
The International Application No. PCT/US2020/026156, "International Preliminary Report on Patentability" mailed Oct. 28, 2021, 7 pages.
The International Application No. PCT/US2020/026156, "International Search Report and Written Opinion" mailed May 28, 2020, 11 pages.

* cited by examiner

400

```
┌─────────────────────────────────────────────────────────────┐
│           Present Reminders Application UI 402                │
└─────────────────────────────────────────────────────────────┘
                            │
                            ▼
┌─────────────────────────────────────────────────────────────┐
│                  Receive Touch Input 404                     │
└─────────────────────────────────────────────────────────────┘
                            │
                            ▼
Yes      ╱────────────────────────────────────────╲      No
   ◄─────    Attribute Associated with Reminder? 408   ─────►
         ╲────────────────────────────────────────╱
   │                                                        │
   ▼                                                        ▼
┌──────────────────────────────┐    ┌──────────────────────────────────────┐
│  Present Attribute Icon(s) 414│    │ Determination Location of Touch Input 410│
└──────────────────────────────┘    └──────────────────────────────────────┘
   │                                                        │
   ▼                                                        ▼
┌──────────────────────────────┐    ┌──────────────────────────────────────┐
│ Determine Location of Touch   │    │ If Location within UI Element,        │
│         Input 416             │    │        Close Reminder 412             │
└──────────────────────────────┘    └──────────────────────────────────────┘
   │
   ▼
First    ╱────────────────────────────────────────╲    Second
   ◄─────    First Portion or Second Portion? 418      ─────►
         ╲────────────────────────────────────────╱
   │                                                        │
   ▼                                                        ▼
┌──────────────────────────────┐    ┌──────────────────────────────────────┐
│     Close Reminder 420        │    │   Present Attributes Information 422   │
└──────────────────────────────┘    └──────────────────────────────────────┘
```

FIG. 4

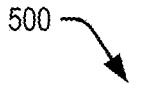
500
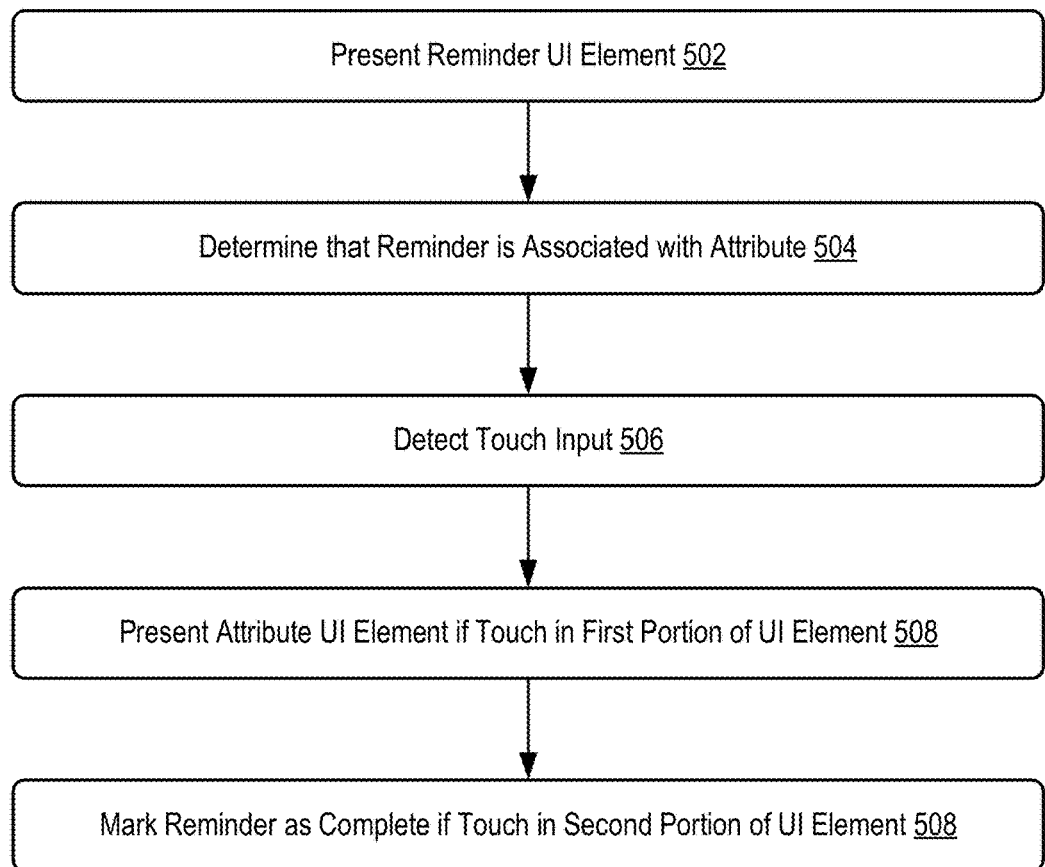
Present Reminder UI Element 502
Determine that Reminder is Associated with Attribute 504
Detect Touch Input 506
Present Attribute UI Element if Touch in First Portion of UI Element 508
Mark Reminder as Complete if Touch in Second Portion of UI Element 508
FIG. 5

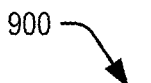
900
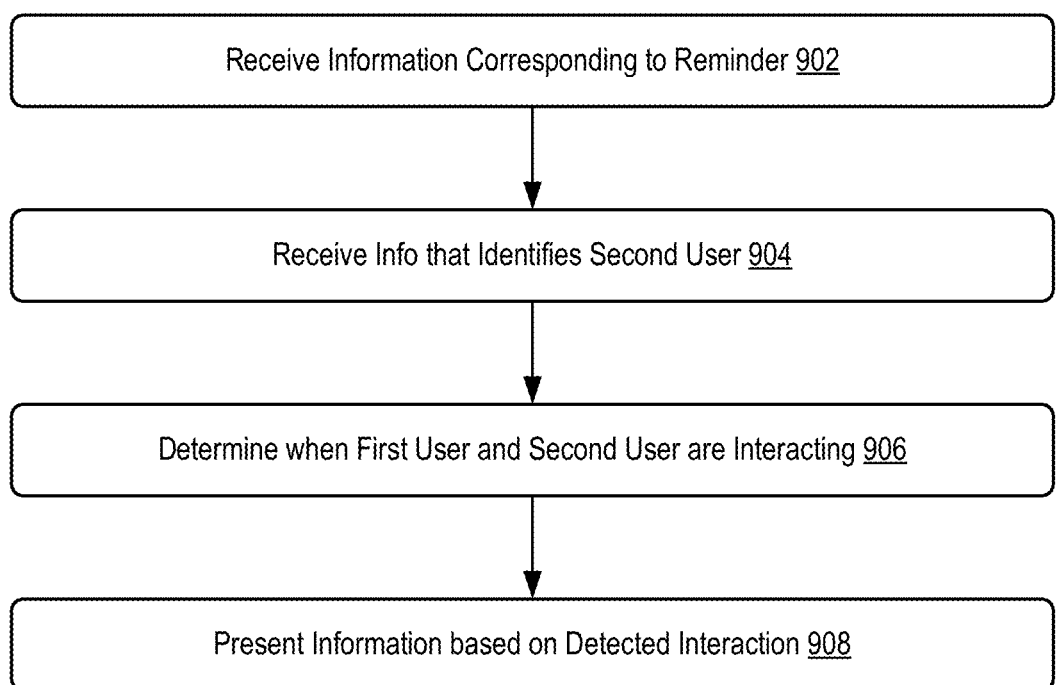
Receive Information Corresponding to Reminder 902
Receive Info that Identifies Second User 904
Determine when First User and Second User are Interacting 906
Present Information based on Detected Interaction 908
FIG. 9

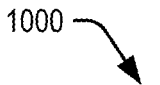
1000
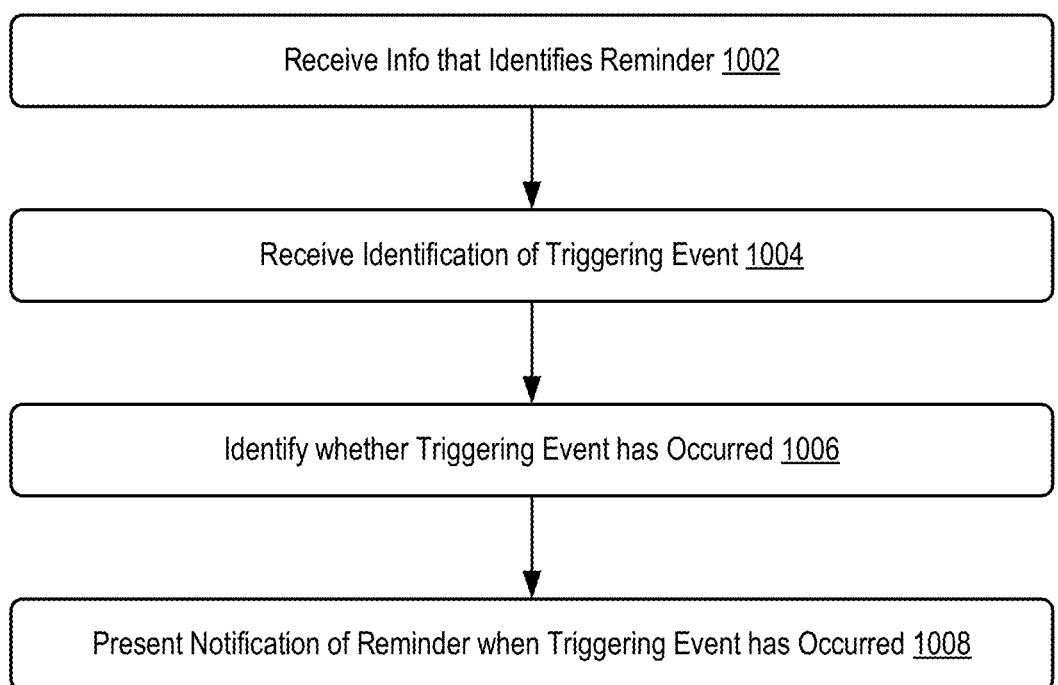
Receive Info that Identifies Reminder 1002
Receive Identification of Triggering Event 1004
Identify whether Triggering Event has Occurred 1006
Present Notification of Reminder when Triggering Event has Occurred 1008
FIG. 10

1300 —

Identify Application of Interaction 1302

↓

Identify Item of Information Corresponding to Application 1304

↓

Receive Request to Generate Reminder 1306

↓

Generate Reminder based on Request 1308

↓

Receive Configuration Information that Identifies Triggering Event 1310

↓

Present Notification with Item of Information when Triggering Event Detected 1312

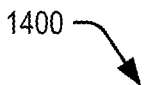
1400
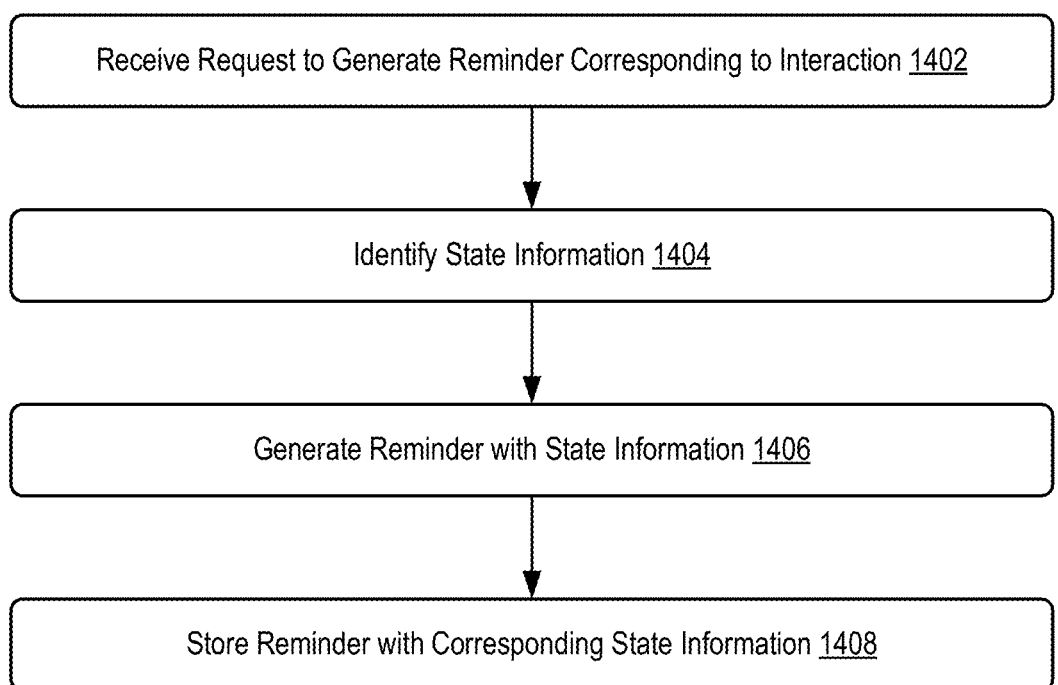
Receive Request to Generate Reminder Corresponding to Interaction 1402
Identify State Information 1404
Generate Reminder with State Information 1406
Store Reminder with Corresponding State Information 1408
FIG. 14

1900

Present Reminders UI 1902

Identify Request to Generate Reminder 1904

Present Reminder UI Element 1906

Present Configuration UI Elements Adjacent to Reminder UI Element 1908

Receive Selection of One Configuration UI Elements 1910

Present Configuration Options 1912

Receive Input Corresponding to Option 1914

Configure Reminder based on Input 1916

REMINDERS TECHNIQUES ON A USER DEVICE

CROSS-REFERENCES TO RELATED APPLICATIONS

This application claims the benefit of U.S. Provisional Application No. 62/834,881, filed Apr. 16, 2019, entitled "REMINDERS TECHNIQUES ON A USER DEVICE," U.S. Provisional Application No. 62/855,760, filed May 31, 2019, entitled "REMINDERS TECHNIQUES ON A USER DEVICE," and U.S. Nonprovisional Application Ser. No. 16/789,080, filed Feb. 12, 2020, entitled "REMINDERS TECHNIQUES ON A USER DEVICE." The disclosures of these applications are incorporated by reference herein in their entireties.

BACKGROUND

Software applications can be utilized to provide a plethora of different types of functions and information to users. Today, many software applications purport to help a user be more organized, manage everyday tasks, and even provide reminders and/or recommendations. However, not all applications integrate well with one another, and many tasks and/or events go unrecognized by the software applications. As such, challenges remain with providing useful reminders to users.

BRIEF SUMMARY

Embodiments of the present disclosure can provide systems, methods, and computer-readable media for generating, configuring, and providing notifications for reminders.

In some embodiments, a computer-implemented method is disclosed. The method may comprise identifying, by a user device, an application with which a user of the user device is interacting; identifying an item of information corresponding to the application; receiving a request to generate a reminder corresponding to the item of information; generating the reminder based at least in part on the request; receiving configuration information that identifies a triggering event for notifying the user about the reminder; and in accordance with detection of the triggering item, presenting a notification of the reminder that includes the item of information.

In some embodiments, the item of information comprises at least one of a title of the reminder or an attribute associated with the reminder. In some embodiments, the item of information comprises a uniform resource locator (URL) associated with the application. In some embodiments, the item of information comprises state information corresponding to a state of the application when the request to generate the reminder was received. In some embodiments, the method further comprises receiving selection of a user interface element provided in the notification and based at least in part on the selection, returning to the state of the application when the request to generate the reminder was received. In some embodiments, the method also comprises implementing an application programming interface (API) call to return to the state of the application when the request to generate the reminder was received. In some embodiments, the triggering event comprises at least one of a date, a time, or a location of the user device. In some embodiments, the request to generate the reminder is received via a reminder user interface element presented over a user interface corresponding to the application.

In some embodiments, a computing device is disclosed. The computing device may comprise a memory configured to store computer-executable instructions and a processor configured to access the memory and execute the computer-executable instructions to perform operations. The operations may comprise identifying a state of the computing device; receiving a request to generate a reminder corresponding to the state of the computing device; generating the reminder based at least in part on the request; determining when to notify the user about the reminder; and in accordance with a determination to notify the user about the reminder, presenting a notification of the reminder.

In some embodiments, the state of the computing device comprises an indication of an application with which the user is interacting. In some embodiments, the application comprises a web browser, a contacts application, a mapping application, or a communication application. In some embodiments, the determination to notify the user about the reminder is based at least in part on at least one of a date, a time, or a location of the computing device. In some embodiments, the state of the computing device comprises a user interface state. In some embodiments, the one or more processors are further configured to execute the computer-executable instructions to at least, receive selection of a user interface element that is included in the notification of the reminder, and return a user interface of the computing device to the user interface state of the computing device at a time of the request to generate the reminder. In some embodiments, the request to generate the reminder is received as a voice command.

In some embodiments, a computer-readable storage medium is disclosed. The computer-readable storage medium may store computer-executable instructions that, when executed by one or more processors of a computing device, configure the one or more processors to perform operations. The operations may comprise receiving a request to generate a reminder corresponding to an interaction with the computing device; identifying state information corresponding to the interaction based at least in part on the request; generating the reminder that includes the state information; and storing the reminder, in association with a reminders application, with the corresponding state information.

In some embodiments, the one or more processors further perform instructions comprising: detecting an event that triggers a determination to provide a notification of the reminder, and providing the notification of the reminder based at least in part on detection of the event. In some embodiments, the notification comprises a selectable user interface element that identifies the state information. In some embodiments, selection of the selectable user interface element causes the computing device to launch an application corresponding to the state information. In some embodiments, the reminders application is configured to present the reminder in at least one list of reminders based at least in part on launch of the reminders application.

BRIEF DESCRIPTION OF THE DRAWINGS

FIG. 4 is a flow diagram that details a process for implementing the disclosed techniques, according to some embodiments.

FIG. 5 is a flow diagram that details a process for implementing the disclosed techniques, according to some embodiments.

FIG. 9 is a flow diagram that details a process for implementing the disclosed techniques, according to some embodiments.

FIG. 10 is a flow diagram that details a process for implementing the disclosed techniques, according to some embodiments.

FIG. 14 is a flow diagram that details a process for implementing the disclosed techniques, according to some embodiments.

DETAILED DESCRIPTION

Figure 1:
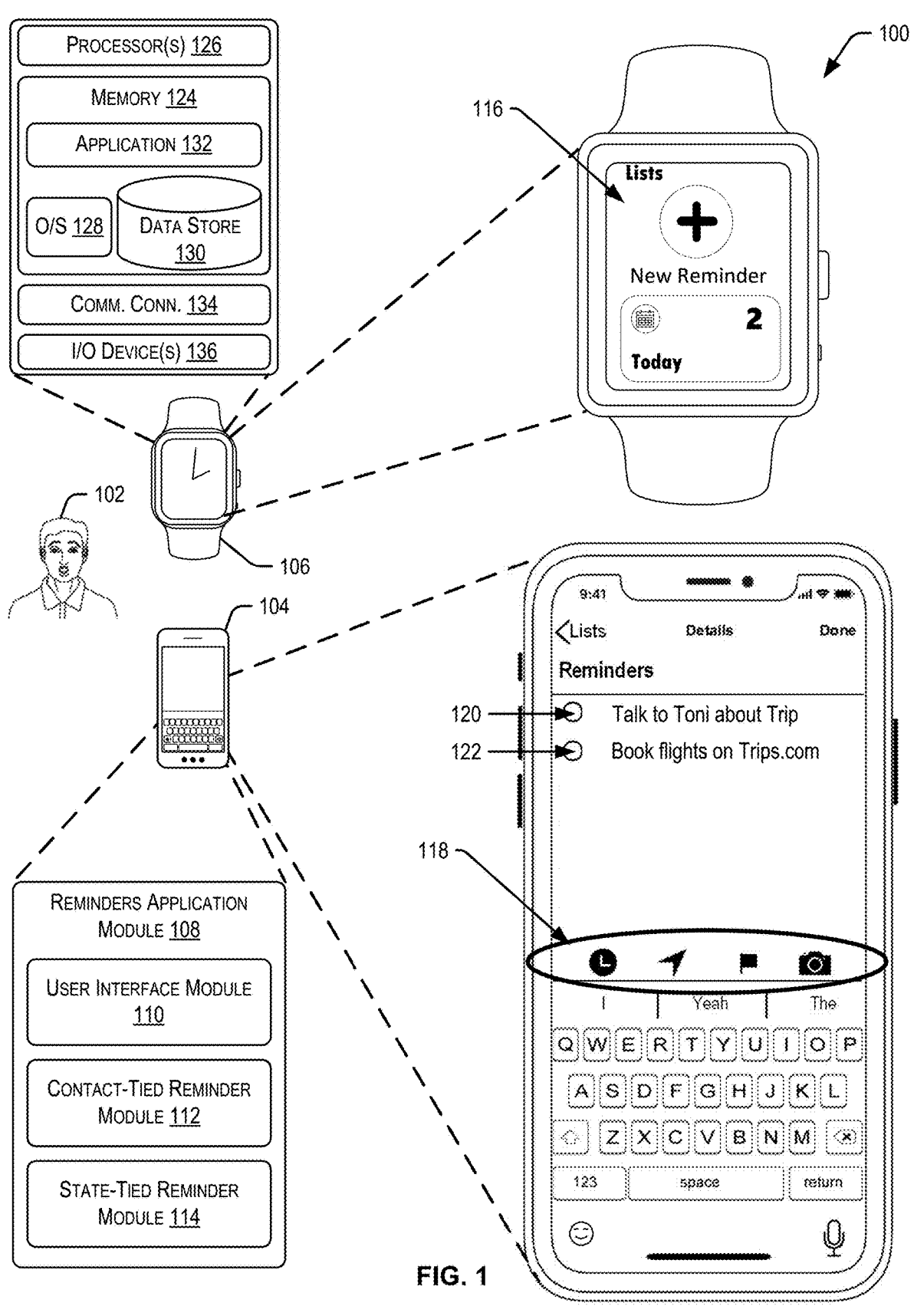
FIG. 1 is a block diagram of an example environment for implementing the disclosed techniques, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, generating reminders based at least in part on information identified in device applications. In some examples, reminders may remind a user about a task or action to be performed on an object (e.g., a physical object, a virtual object, or the like). As used herein, a "task" or "action" may include any suitable activity to be performed by a user. Additionally, "reminders" may include any suitable electronic delivery mechanism in any suitable form (e.g., alarms, alerts, emails, notifications (e.g., push), badges, etc.). The examples and contexts of such examples provided herein are intended for illustrative purposes and not to limit the scope of this disclosure.

In some examples, techniques for providing reminders may be provided by a software application or operating system of a user device. Various techniques can be utilized to enhance or otherwise improve on how and/or when a user device provides reminders and/or notifications about reminders to a user. In some examples, an operating system of a user device may be configured to execute a reminders application and/or integrate a reminders application with other software applications. Additionally, the reminders application may be configured to provide various user interfaces (UIs) for implementing or otherwise effectuating the various reminders techniques.

In at least one example, reminders may be generated, configured, and/or presented on a wearable device. The wearable device may have less screen area than most other user devices; thus, the UI elements may be configured differently. Additionally, some of the functionality of the reminders techniques described herein may be provided differently. The differences and technical advantages are readily apparent via at least two examples that involve creation/generation of reminders and the termination (e.g., closing) of reminders.

For example, a reminder may be generated in response to receiving a request (e.g., by receiving a hard press (e.g., forcibly pressing on the screen for a period of time) on the display (e.g., a touch screen) of the wearable device and/or by receiving a voice command) while the wearable device is presenting a UI associated with a reminders application. If the wearable is currently presenting the main reminders UI interface (e.g., a reminders home page), the newly generated reminder may not be associated with any curated or non-default reminders lists. For example, the reminder may be listed in an "All Reminders" category, or a general (e.g., default) "Reminders" category; however, that may be all. Alternatively, if the wearable is presenting a "Lists" interface (e.g., a lists page that shows all reminders lists) when the request to create the reminder is received, the newly generated reminder may be automatically created with an association to one of the lists.

Additionally, in some examples, reminders, once created, can be closed (e.g., indicated as completed) via a touch input. Additionally, reminders may be associated with attributes. An attribute, in some examples, can be any additional information corresponding to the reminder, other than the title. For example, attributes can include flags, attachments (e.g., photos, documents, etc.), notes, due dates (e.g., when the reminder should be completed and/or when a notification should be provided), information about location, and/or information about recurrence of the reminder. In some examples, the when the reminder UI element is being presented, the user can close the reminder by tapping the reminder. A circular-shaped UI element may be represented for each reminder (e.g., in the upper left (or other) corner of the reminder UI element). When a reminder is closed, the circular-shaped UI element may be filled in. The filling-in of the circle may indicate that the reminder has been closed and/or the task associated with the reminder was completed. In some examples, if the reminder is not associated with any attributes, the reminder may be closed by tapping anywhere in the reminder UI element. However, in some examples, if the reminder is associated with any attributes, tapping on one portion of the reminder UI element (e.g., the left side) may close the reminder, while tapping on another portion (e.g., the right side of the reminder UI element) may instead open an additional UI element that enables the user to drill down into details about the attributes.

In at least one example, reminders may be tied to another user or user account. For example, in some instances, the reminders application may be configured to set reminders for events/actions that are to be performed when the user is interacting with another user. In some examples, the reminders application can remind the user about an event when they are messaging another user, calling another user, or physically near the other user. As an example, a reminder may be set by person A, to remind them to talk about a particular item/event (e.g., an upcoming trip, a thing to purchase or do) the next time that person A is interacting with person B. The reminder may be set by indicating the particular event to discuss, and the channel and/or medium by which the two may interact. For example, the reminder may notify person A about the event to discuss based on identification of person A and person B being involved in a text message, instant message, telephone call, or the like. Similarly, the reminder may be triggered when person A and person B are within a threshold physical distance of one another (e.g., one, two, ten, etc., feet of each other). In some instances, the two users may have devices with geolocation services, and the two devices may be able to detect when the two users are near each other (e.g., within the threshold distance). In other instances, the two devices may utilize a calendar application, and it may be detected that both users are expected to be at a particular location at the same time. Alternatively, the device of person A may identify that the two users are near each other based at least in part on network connectivity (e.g., if both devices are connected to the same WiFi network or the like). In any of these instances, the user may be notified of the reminder, so that user A is reminded to discuss the event or topic with user B when they are interacting with one another.

In another example, reminders may be automatically (or manually, e.g., based at least in part on user input) generated based at least in part on applications/items that the user is currently interacting with and/or viewing on the device. For example, a user can create a reminder based on information in an application that the user is using. Examples include, but are not limited to, generating a reminder about an email from an email application, a text from a text application, a website or item of information found in a web browser, or the like. Additional examples include reminders about locations and/or directions found in a map application, dates found in a calendar application, etc. When a reminder is generated (e.g., based at least in part on touch and/or voice input of a user) that is related to an interaction, the state of the user device may be captured and stored. This state information can then be associated with the reminder such that when the user is notified of the reminder (e.g., if the user selects a UI element that identifies the state information), the user device can return to its previous state (e.g., the state of the device when the reminder was generated), thus taking the user back to the item or interaction that they wanted to be reminded about. In one example, a user could be viewing directions to a location. They could speak to the device (or select a UI element), and ask for a reminder about the directions. In some examples, they could configure the reminder to notify them about the reminder at a later time (or at some other location). When the user is notified of the reminder, if they select to go back to the directions, the map application can relaunch (if it's not currently being executed) and return to the directions that were being presented earlier.

In some instances, the features described herein can be automatically generated and/or recommended to the user based at least in part on activity and/or interaction of the user. For example, using natural language processing (NLP), the reminders application (or a daemon running via the OS) can detect text or actions of the user, and determine that a reminder would be helpful. In this case, a reminder may be generated automatically or a reminder prompt may be suggested to the user, where the user can then edit and/or accept the reminder. The reminders that are generated using these techniques can be added to a Reminders List and/or provided in a Reminders list UI.

In another example, the techniques described herein can be directed towards providing a reminders UI with one or more configuration elements. The configuration elements can be provided to enable quick selection for configuring dates/times, locations, importance flags, and/or image attachments. Using the configuration elements, a user can quickly configure the reminder to add features, such as when to remind the user (e.g., when to provide a notification of the reminder), where to remind the user (e.g., at what location to provide a notification of the reminder), and/or what to include in the reminder (e.g., whether there should be attachments, notes, flags, etc.).

When a user creates a reminder, the configuration elements may be provided (rendered) on the screen next to the reminder itself. The rendering of the configuration elements during the creation of the reminder, along with the location of the rendering can make it easy for the user to configure the reminder with additional configuration information. For example, the user configuration elements can include date/time configurations (e.g., when to present a notification about the reminder), location configurations (e.g., at what location to provide a notification about the reminder), importance flag configurations (e.g., how important is the reminder), and/or attachment configurations (e.g., what images, documents, etc., are to be attached to the reminder).

In some examples, various time-saving techniques can be implemented to aid in quickly configuring the reminders (e.g., at creation). For example, if the user is selecting a location at which the reminder notification should be presented, the device may first determine the current day of the week. In some cases, if the current day is a week day (e.g., Sunday through Thursday), the options for quickly configuring the reminder may include "today," "tomorrow," and "this weekend." However, if the current day is a weekend, the options may instead include "today," "tomorrow," and "next weekend," in order to avoid the "tomorrow" and "this weekend" options to configure the notification for the same day. Additionally, in another example, if the user is configuring the location for triggering the notification, the options may include, but are not limited to, "home," "work," or some location of interest (LOI). LOIs can include any location that has been saved to a user's account or is regularly visited by the user (e.g., if a user regularly shops at a particular grocery store, that store (and/or location) may be saved as an LOI for that user). In some instances, the user may be asked whether the location should be an arrival location or a departure location. However, in other examples, the device may first determine a current location of the user or user device. In this case, if the user is at "home" and selects "home," the device will automatically set this location as a departure location. Conversely, if the user selects "home," but is not located at home, the device will automatically set the location as an arrival location. The same logic will apply regardless of the actual location. For example, if the user is at the location they are selecting for the trigger, it will be set as a departure location trigger, but if the use at a different location from the location they are selecting, it will be set as an arrival location trigger.

In another example, the techniques described herein are directed towards organizing reminders into lists. In some examples, each list can include reminders for the day, plus reminders based at least in part on triggers. In this way, the lists can be updated dynamically as appropriate. Additionally, the notifications can be user-configurable. Reminders can be grouped based on the type of reminder (e.g., flagged versus scheduled, etc.) or based on information about the notification settings (e.g., scheduled for today, tomorrow, or some other day). In some examples, the reminders in the lists can be a combination of reminders that are to be notified/ completed in a particular day with opportunistic reminders that were triggered based at least in part on various actions/ activities of the user.

In another example, the techniques described herein are directed towards providing configurable snooze options. In some examples, a dynamic snooze options can be tied to a trigger (e.g., snooze till the user arrives at a specific location (e.g., home, the grocery store, etc.)), snooze till the user performs some action, etc. Any event can be used as the triggering item that sets a new notification time/location for the reminder.

Such concepts will be discussed further below with respect to at least FIGS. 1-19.

FIG. 1 depicts a block diagram of an example environment 100 for implementing the disclosed techniques, according to some embodiments. The environment 100 may include two devices of a user 102, where the first device is any user device (e.g., a mobile phone, a tablet, etc.) 104, and the second device is any wearable device (e.g., a smart watch or the like) 106. In some examples, the user 102 may utilize either or both of the user device 104 or the wearable device 106 to generate reminders. The reminders can be generated, configured, stored, and/or presented using one more applications executed by either or both of the user device 104 or the wearable device 106. For example, the user device 104 and/or the wearable device 106 may con-figured with a reminders application module 108. Even though FIG. 1 illustrates the reminders application module 108 as part of the user device 104, it should be understood that the same or similar applications/modules can be executed by the wearable device 106 as well.

Additionally, in some examples, the reminders applica-tion module 108 may be configured to execute program code for implementing one or more other software modules (e.g., a user interface module 110, a contact-tied reminder module 112, and/or a state-tied reminder module 114). In some cases, the reminders application module 108 may be con-figured to implement the reminders application described herein, including presenting the reminders application user interface, within which all of the UI elements described herein can be presented. Additionally, in some examples, the UI module 110 can be configured for generated and/or presenting the UIs described herein, including the reminders application UI itself and/or the various UI elements. The contact-tied reminder module 112 can be configured to implement the techniques described herein that enable reminders that are tied or otherwise associated with one or more other users or user devices (e.g., the other users can be contacts of the user 102). The state-tied reminder module 114 can be configured to implement the techniques described herein that enable reminders that are tied or otherwise associated with one or more items and/or user interactions (e.g., items or interactions with the UI) with the devices 104, 106. For example, if a user is viewing a map, the state-tied reminder module 114 can capture the state of the device 104, 106, including the current interaction with the device (e.g., viewing the map), and upon request, can return the device to that state for continuing where the user 102 left off.

In at least one example, the user interface module 110 may be configured to present a wearable device UI 116 that includes one or more reminders lists (e.g., in this case, the "today" list is illustrated). In this example, the "today" list includes two reminders, indicated by the "2" in the upper right-hand corner of the "today" list. Additionally, the wear-able device UI 116 can include a "New Reminder" button, that when hard pressed or long pressed (e.g., with force or for a threshold amount of time (e.g., more than one second or the like)), can be used to generate a new reminder. In some examples, the new reminder may be generated as part of a list, if the reminder is created in a list UI (e.g., as seen in FIG. 1). However, in other examples, the new reminder may be generated as part of a default list (e.g., a default folder).

Additionally, the UI module 110 may also be configured to present a "quick bar" 118 that can enable quick configu-ration/customization of any reminder. For example, the quick bar 118 can provide configuration functionality while generating a new reminder and/or after a new reminder has already been generated. In some examples, the quick bar 118 can include a time UI element (illustrated by the clock icon), a location UI element (illustrated by the compass arrow icon), a flag UI element (illustrated by the flag icon), and an attachment UI element (illustrated by the clock icon). If the user 102 selects the time UI element, the user 102 can quickly select from one or more time configuration options (e.g., when the user should be notified of the reminder. If the user 102 selects the location UI element, the user 102 can quickly select from one or more location configuration options (e.g., where the user should be when notified of the reminder). If the user 102 selects the flag UI element, the user 102 can quickly select from one or more flags to customize the reminder. If the user 102 selects the attach-ment UI element, the user 102 can quickly select from one or more attachment configuration options (e.g., whether to attach an image, a uniform resource locator (URL), a docu-ment, or the like).

In some examples, the contact-tied reminder module 112 may be configured to enable the user 102 to generate an assignment that is tied to another user or user device. For example, the contact-tied reminder module 112 can enable the user 102 to generate the first reminder 120 shown in the reminders application illustrated on the display of the user device 104. Here, the first reminder 120 is entitled "Talk to Toni about Trip." Thus, this reminder is configured to notify the user 102 to talk about a trip with another person, in this case Toni (e.g., a contact of the user 102). The contact-tied reminder module 112 can then determine the next time that the user 102 is in communication with Toni, or is at least likely to be physically near Toni, and provide a notification of the reminder based at least in part on that determination. For example, if the user 102 begins to send a message (e.g., a text or other electronic message) to Toni or place/answer a call with Toni, the contact-tied reminder module 112 may notify the user 102 of the reminder. Additionally, in some examples, the contact-tied reminder module 112 may have access to location information and/or calendar information, and can notify the user 102 of the reminder when it detects that the user 102 and Toni are physically near each other, are scheduled to be near each other, and/or are scheduled to be in a meeting together (e.g., even if the two are physically far apart).

In some examples, the state-tied reminder module 114 may be configured to store the state of a user, generate a reminder that includes the state information, and then notify the user at a later time go back to that state. For example, the second reminder 122 shown in the reminders application illustrated on the display of the user device 104 is a reminder to "Book flights on Trips.com." In this example, the user may have created a reminder that was associated with the website Trips.com. For example, the user may have been using a Web browser or other application that enables viewing of the website Trips.com. Upon a request to generate a reminder for this website, the state-tied reminder module 114 may generate a reminder that includes the URL which was being viewed/interacted with. This state information, when acted on, can be used to return the user to viewing the Trips.com website. For example, when the user 102 is notified of the reminder 122, the user may be presented with a UI element that shows the URL. Upon selection of that state information, the user device 104 may launch the web browser, and go back to the appropriate URL (in this case, Trips.com).

In one illustrative configuration, the user device(s) 104, 106 may include at least one memory 124 and one or more processing units (or processor(s) 126). The processor(s) 126 may be implemented as appropriate in hardware, computer-executable instructions, firmware, or combinations thereof. Computer-executable instruction or firmware implementations of the processor(s) 126 may include computer-executable or machine-executable instructions written in any suitable programming language to perform the various functions described.

The memory 124 may store program instructions that are loadable and executable on the processor(s) 126, as well as data generated during the execution of these programs. The memory 124 may include an operating system 128, one or more data stores 130, and/or one or more application programs, modules, or services (e.g., application 132) for implementing the features disclosed herein with respect to the figures. In some embodiments, the application 132 may be the reminders application module 108. Depending on the configuration and type of user computing device, the memory 124 may be volatile (such as random access memory (RAM)) and/or non-volatile (such as read-only memory (ROM), flash memory, etc.). The user device(s) 104, 106 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 124 may include multiple different types of memory, such as static random access memory (SRAM), dynamic random access memory (DRAM), or ROM.

The memory 124 and additional storage, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data.

The memory 124 and additional storage are examples of computer storage media. Additional types of computer storage media that may be present in the user device(s) 104, 106 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device(s) 104, 106 may also contain communications connection(s) 134. The communication connection(s) 134 may allow the user device(s) 104, 106 to communicate with a stored database, another user device or server, user terminals and/or other devices on one or more networks. The user device(s) 104, 106 may also include I/O device(s) 136. The I/O device(s) 136 may include devices such as a keyboard, a mouse, a pen, a voice input device, a touch input device, a display, speakers, a printer, etc.

Figure 2:
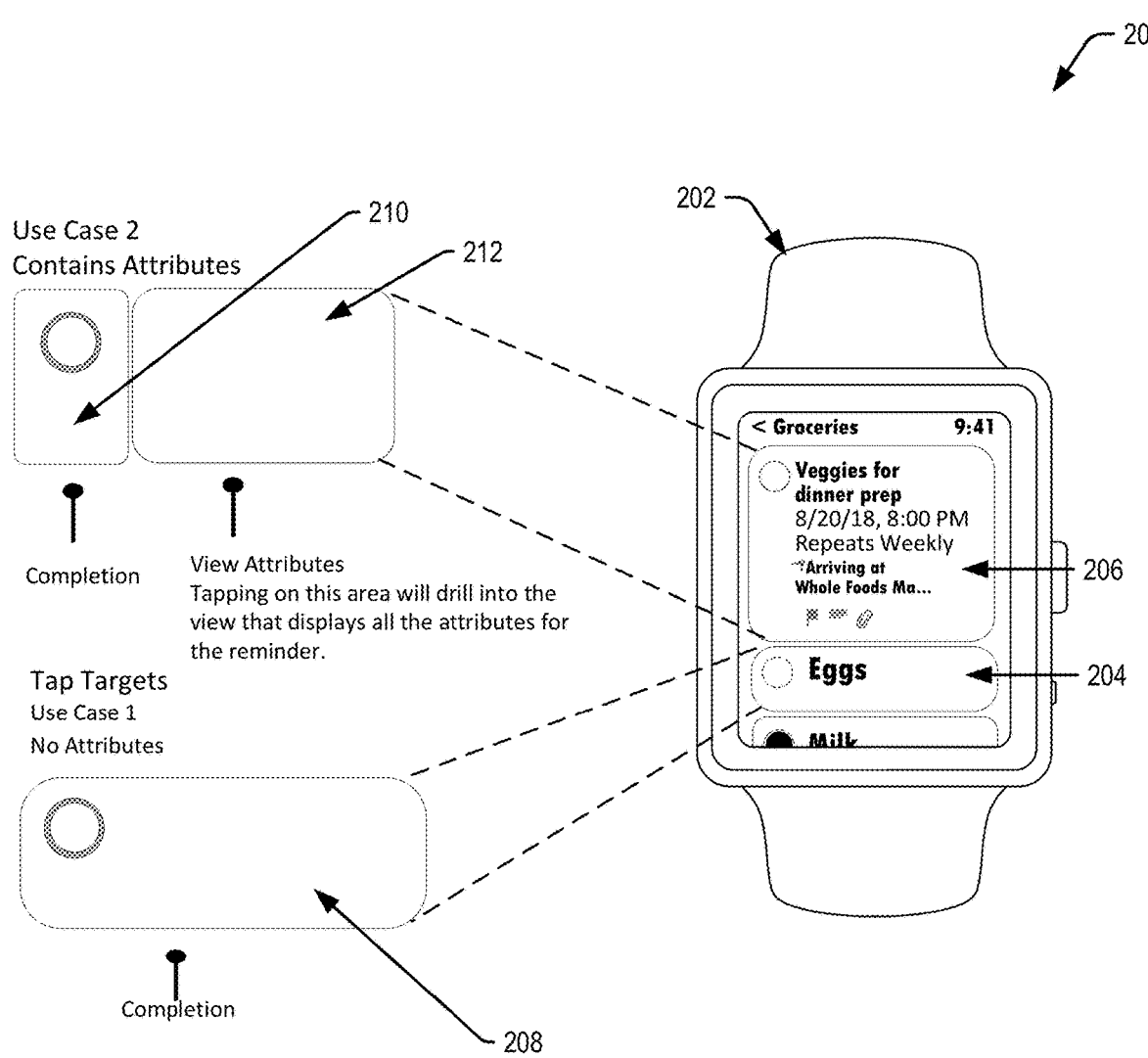
FIG. 2 is a block diagram of an example user interface for implementing the disclosed techniques, according to some embodiments.

FIG. 2 illustrates additional examples 200 of functionality that can be implemented by execution of the UI module 110 of FIG. 1 on a wearable device 202. In some examples, the UI element 210 of the wearable device 202 may be presented on a smaller screen than is available on larger user devices (e.g., user device 104 of FIG. 1), due mostly to the smaller form factor of wearables. As such, different mechanisms for interacting with the UI can be employed. For example, in some cases, two different methods of closing a reminder (e.g., marking a reminder as complete) can be implemented on the wearable device 202. In one examples, a first reminder UI element 204 may not include any attributes. For example, reminder UI element 204 is a reminder entitled "eggs." However, this reminder does not have any attributes as illustrated with no icons showing on the UI element. On the other hand, the second reminder UI element 206 has at least six attributes. As discussed herein, attributes can include a reminder date, recurrence information, a reminder location (including whether it's an arrival location or a departure location), a flag, one or more notes, and/or one or more attachments. In the illustrated examples, reminder 228 includes all of these attributes.

In some examples, the first reminder UI element 204 can be closed (e.g., marked as completed) by tapping anywhere within the UI element, illustrated as blown up UI element 208. Once closed, the circular icon may be filled in, as can be seen with the reminder UI element called "milk" below the "eggs" reminder 204. Alternatively, if the reminder includes attributes, such as with second reminder UI element 206, the reminder can be closed by tapping on the left side of the UI element, illustrated as blown up UI element 210, instead of tapping anywhere. However, if the right side of the UI element, illustrated as blown up UI element 212, is tapped (e.g., when there are attributes associated with the reminder), a second UI element can be presented that enables the user to drill down into a view that displays information about the attributes that are associated with reminder.

Figure 3:
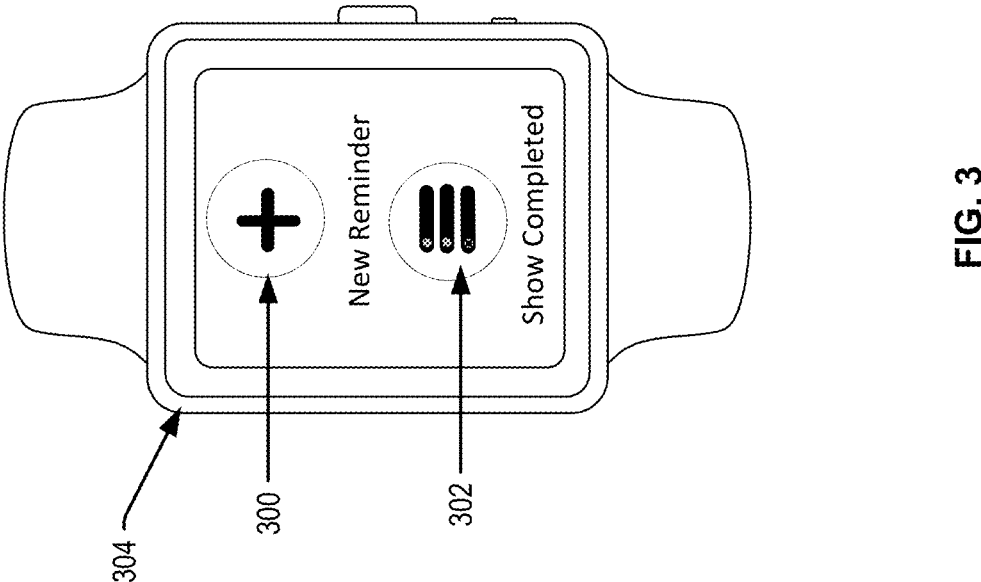
FIG. 3 is a block diagram of an example user interface for implementing the disclosed techniques, according to some embodiments.

FIG. 3 illustrates a new reminder UI element 300 and a "show completed" UI element 302 on a wearable device

304. In some examples, a new reminder may be generated via a voice command (e.g., the user may say "Hey device, create a new reminder,"). Upon detection of the voice command, the new reminder can be generated. However, in other examples, the user may generate a new reminder by tapping, long pressing, or hard pressing on the new reminder UI element 300. As discussed herein, if the user is currently viewing the main portion of the reminders application UI, the new reminder may be associated with a default list and/or stored in the "all reminders" list. However, if the user is interacting with a reminders list UI, the new reminder may be generated and automatically associated with one of the lists in the reminders list UI. Additionally, the "show completed" UI element 302 can be utilized to toggle between showing completed reminders and hiding completed reminders. In some examples, the element 302 can also be activated by tapping, log pressing, and/or hard pressing.

FIG. 4 is an example flow 400 for implementing reminder generation techniques, in accordance with at least one embodiment where a reminder may or may not include attributes. It should be appreciated that the flow 400 may include a greater number or a lesser number of operations than those depicted in FIG. 4 and that operations (e.g., the operations depicted in FIG. 4) may be performed in any suitable order. The operations of flow 400 may be performed by the wearable device 106 of FIG. 1 or any computing device configured to provide such functionality (e.g., the user device 104 of FIG. 1), or any suitable combination of the two.

The flow 400 may begin at 402, where the wearable device 106 may present a reminders application UI. For example, a reminders application UI may be any type of software application that can provide a UI for creating, configuring, storing, notifying about reminders. In some instances, there may be various views within the reminders application UI.

At 404, the wearable device 106 may receive a touch input on a reminder UI element (e.g., on a touch sensitive screen of the wearable device 106). In some examples, the reminder UI element is the individual UI element that represents the reminder (e.g., reminder UI element 204 of FIG. 2 with attributes or reminder UI element 206 of FIG. 2 without attributes).

At 408, the wearable device 106 can be configured to determine whether the reminder includes or is associated with one or more attributes. If the reminder does not include any attributes, the wearable device 106 can determine the location of the touch input at 410 and then close the reminder if the location of the touch input is anywhere within the UI element at 412. In this way, the user can quickly complete the reminder by simply tapping the UI element for the reminder.

Alternatively, if the reminder does include attributes, the wearable device 106 can present icons that represent the attributes at 414 (in some examples, this step can actually be done when the reminder is presented at 402), determine the location of the touch input at 416 and then identify whether the touch input was at a first portion or a second portion of the reminder UI element.

At 420, if the wearable device 106 determines that the touch input was in the first portion (e.g., a left-most portion or left-most ⅓ portion), the reminder may be closed or marked as completed.

At 422, if the wearable device 106 determined that the touch input was in the second portion (e.g., a right-most portion or right-most ⅔ portion), attribute information may be presented instead of closing the reminder.

FIG. 5 is an example flow 500 for implementing reminder generation techniques, in accordance with at least one embodiment where a reminder may or may not include attributes. It should be appreciated that the flow 500 may include a greater number or a lesser number of operations than those depicted in FIG. 5 and that operations (e.g., the operations depicted in FIG. 5) may be performed in any suitable order. The operations of flow 500 may be performed by the wearable device 106 of FIG. 1 or any computing device configured to provide such functionality (e.g., the user device 104 of FIG. 1), or any suitable combination of the two.

At 502, the wearable device 106 may present a reminder UI element and then determine that the reminder is associated with an attribute at 504. At 506, the wearable device 106 may detect a touch input. At 508, the wearable device 106 may present an attribute UI element if the touch input was detected in a first portion of the reminder UI element. Alternatively, at 510, the wearable device 106 may mark the reminder complete if the touch input was detected in a second portion of the reminder UI element.

Figure 6:
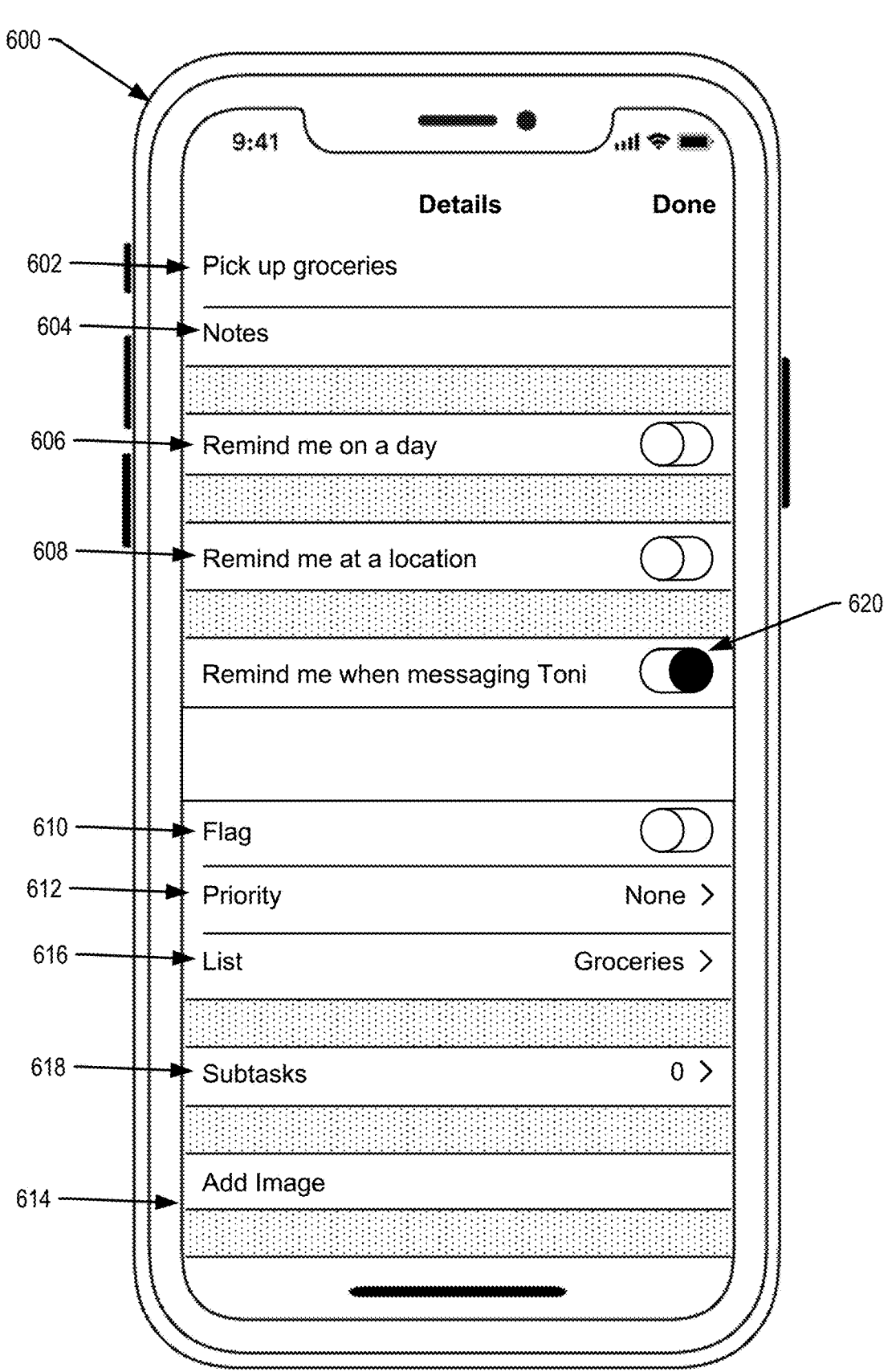
FIG. 6 is a block diagram of an example user interface for implementing the disclosed techniques, according to some embodiments.

FIG. 6 illustrates a reminder generation UI 600 for configuring a reminder, for example on a user device such as user device 104 of FIG. 1. In this example, the reminder can be configured with various parameters and/or attributes. For example, the reminder can be configured with a title (e.g., "pick up groceries") 602 and/or notes 604. Additionally, the reminder can be configured with a day/date for a notification (e.g., when the reminder should be presented) 606 and/or a location for the notification 608. The reminder can also be configured with a flag 610, a priority 612, and/or an image (or other attachment) 614. Additionally, in some examples, the reminder can be configured as part of a list of reminders 616 and/or to have one or more subtasks 618.

In some examples, the reminder can also be configured to be presented based on another user. For example, as described above with connection to the contact-tied reminder module 112 of FIG. 1, a notification of the reminder can be presented based at least in part on communication and/or interaction with a user (e.g., that is listed in a contacts list). In the example of FIG. 6, the option 620 states "Remind me when messaging Toni." In this example, "Toni" may be in a contacts list of the user, and her name may have been selected from a drop-down list or directly from a contacts application. Once this setting is configured, and set to on (e.g., as shown in FIG. 6 with the selection UI element slid to the right), the contact-tied reminder module 112 of FIG. 1 can be configured to identify when the user of the user device 104 is attempting to communicate with and/or is communicating with Toni via a messaging application. For example, if an outgoing text message or instant message is being prepared, that is addressed to Toni, the contact-tied reminder module 112 of FIG. 1 can notify the user of the user device 104 to "pick up the groceries." Based on this, the user may be reminded to ask Toni to pick up the groceries.

Figure 7:
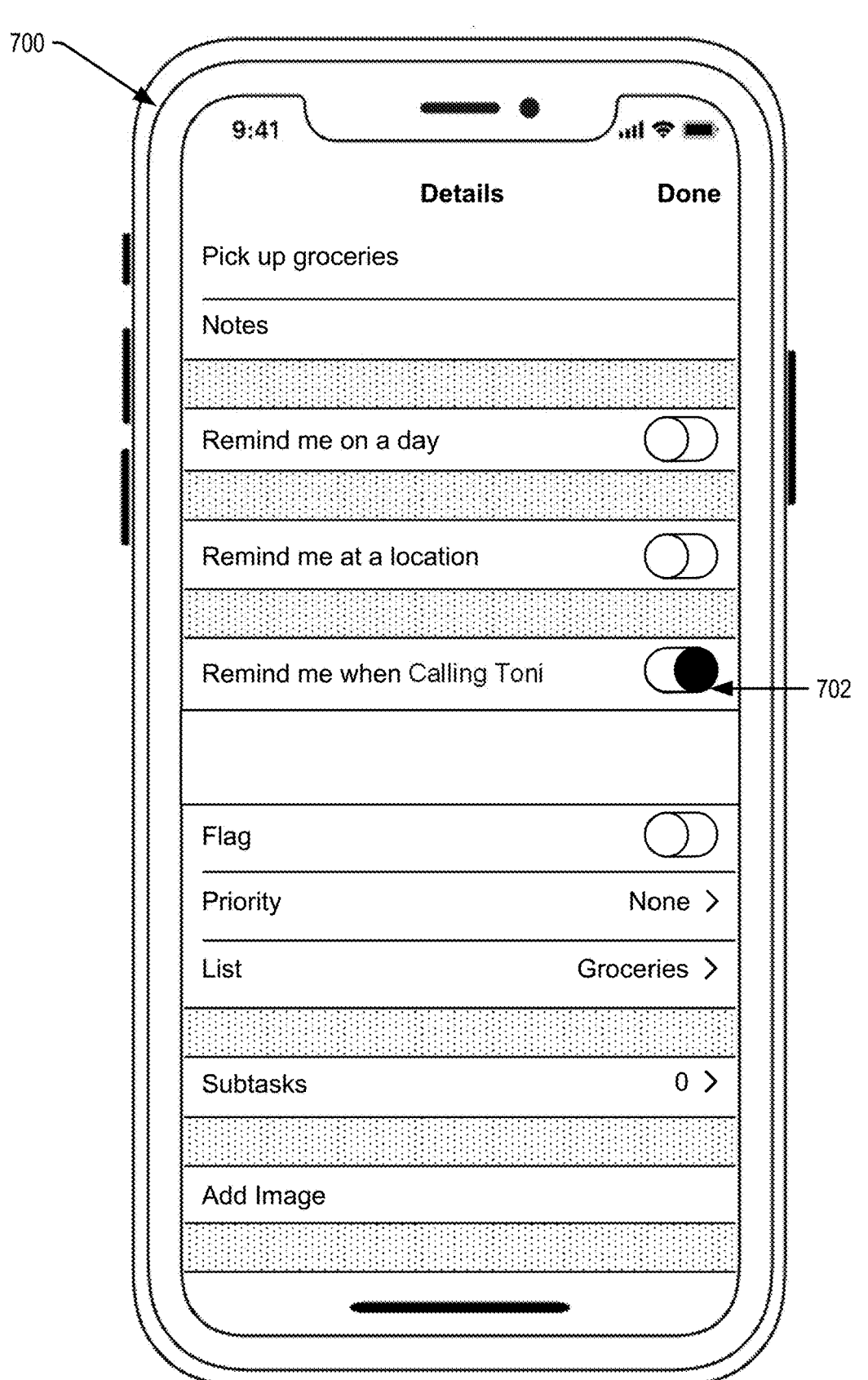
FIG. 7 is a block diagram of an example user interface for implementing the disclosed techniques, according to some embodiments.

FIG. 7 illustrates another example reminder generation UI 700 for configuring a reminder. In this example, the contact-tied reminder module 112 is configured to enable the notification for the reminder to be tied to another user based at least in part on a telephone call (e.g., as seen at the "Remind me when Calling Toni" option 702) as opposed to the messaging application described in FIG. 6. As such, when the user device 104 attempts to call Toni, or receives a call from Toni, the notification for the reminder "pick up groceries" can be presented. In some instances, the notification may be presented on another device (e.g., a wearable device such as the wearable device 106), such that the user can still see the notification even though they are placing the user device 104 to their face. However, in other examples, if the user device 104 detects that the loud speaker is turned on or the user is using a headset, then the notification may be presented directly on the screen of the user device 104 (e.g., as a drop down notification or the like).

Figure 8:
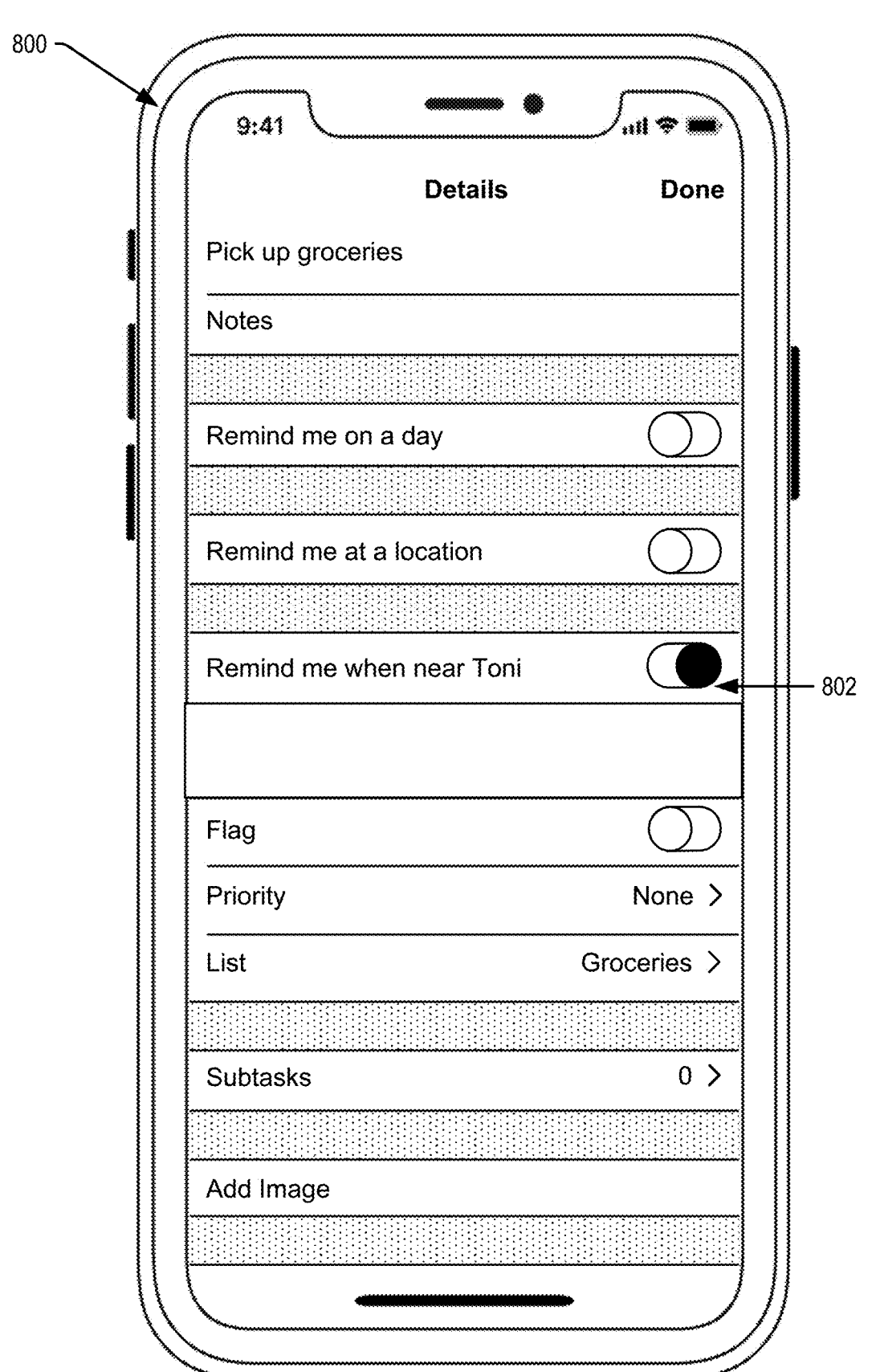
FIG. 8 is a block diagram of an example user interface for implementing the disclosed techniques, according to some embodiments.

FIG. 8 illustrates yet another example reminder generation UI 800 for configuring a reminder. In this example, the contact-tied reminder module 112 is configured to enable the notification for the reminder to be tied to another user based at least in part on locations of the respective users or user devices (e.g., as seen at the "Remind me when near Toni" option 802) as opposed to the messaging application described in FIG. 6 or the calling option in FIG. 7. As such, when the user device 104 detects that the user and Toni are physically near each other (e.g., based on GPS or other location information), the notification for the reminder "pick up groceries" can be presented. In some instances, being "near" Toni may also include being scheduled to be at the same meeting, or being at the same meeting. In this instance, the user device 104 would need to access the calendar applications of both devices. Additionally, in some instances, for any of the examples of FIGS. 6-8, the other user may opt-in and/or opt-out of participating, as these embodiments require that the user device 104 is able to access personal/private information of the other person. Thus, Toni may be presented with an opt-in option once this is configured at the user device 104. The opt-in option may enable Toni to agree for a limited time, only during certain hours/days, or the like. Alternatively, Toni may opt-out of being tracked at any time.

FIG. 9 is an example flow 900 for implementing reminder generation techniques, in accordance with at least one embodiment where a reminder may be tied to another user. It should be appreciated that the flow 900 may include a greater number or a lesser number of operations than those depicted in FIG. 9 and that operations (e.g., the operations depicted in FIG. 9) may be performed in any suitable order. The operations of flow 900 may be performed by the user device 104 of FIG. 1 or any computing device configured to provide such functionality (e.g., the wearable device 106 of FIG. 1), or any suitable combination of the two.

The flow 900 may begin at 902, where the user device 104 may receive an item of information that corresponds to a reminder. The item of information may include the title of the reminder and/or any attributes. The item of information may also include any other information (e.g., metadata) that may be associated with or otherwise usable to identify the reminder.

At 904, the user device 104 may receive information that identifies a second user. The information may include contact information and/or one or more identifiers. In some examples, the second user may need to be listed in a contacts list of the user device 104. In this way, the user can select the second user can be easily selected from the contacts list, and the first user won't need to enter contact information during the reminder setup process.

At 906, the user device 104 may determine when the first user and the second user are interacting. As noted, the user device 104 may make this determination based on actual (e.g., physical) locations of the respective user devices or users (e.g., the location information could be received from a second device of the user, such as a wearable or the like). Interacting can also include the two users messaging, calling each other, and/or being scheduled for the same meeting or meetings nearby one another.

At 908, if the user device 104 can present the notification based at least in part on the detected interaction.

FIG. 10 is an example flow 1000 for implementing reminder generation techniques, in accordance with at least one embodiment where a reminder may be tied to another user. It should be appreciated that the flow 1000 may include a greater number or a lesser number of operations than those depicted in FIG. 10 and that operations (e.g., the operations depicted in FIG. 10) may be performed in any suitable order. The operations of flow 1000 may be performed by the user device 104 of FIG. 1 or any computing device configured to provide such functionality (e.g., the wearable device 106 of FIG. 1), or any suitable combination of the two.

The flow 1000 may begin at 1002, where the user device 104 may receive information that identifies a reminder. At 1004, the user device 104 may receive information that identifies a triggering event. In this example, the triggering event may effectively initiate the notification, and may include information about both the first user and the second user.

At 1006, the user device 104 may identify whether the triggering event has occurred. For example, if the triggering event is an event where the first and second users are at the same physical building address, the user device 104 may be regularly tracking the locations of both devices. Then, once the user device 104 detects that the locations are the same (or at least within a threshold distance of being the same), the user device 104 may present a notification of the reminder at 1008.

Figure 11:
FIG. 11 is a block diagram of an example user interface for implementing the disclosed techniques, according to some embodiments.

FIG. 11 illustrates another embodiment for generating a reminder, for example on a user device such as user device 104 of FIG. 1. In this example, the reminder can be generated by the state-tied reminder module 114 of FIG. 1 while the user is interacting with an application (e.g., a Web browser or the like) 1102. Here, the user may be viewing a page on whiskybase.com, and may select a reminder generation UI element 1104. Upon selection of the reminder generation UI element 1104, the state of the user device may be saved and associated with the reminder. Other attributes may be added to the reminder, as described herein, and the reminder may be configured with notifications based at least in part on time/day, location, and/or other users. However, in this example, when the notification is provided to the user, the user may be able to select the state information. In this embodiment, the state information may identify the URL (e.g., whiskybase.com). Upon selection of the state information in the reminder notification, the user device 104 may launch the Web browser and return to the state that the user device was in when the reminder was generated. In this way, the Web page shown in FIG. 11 may be presented to the user again.

Figure 12:
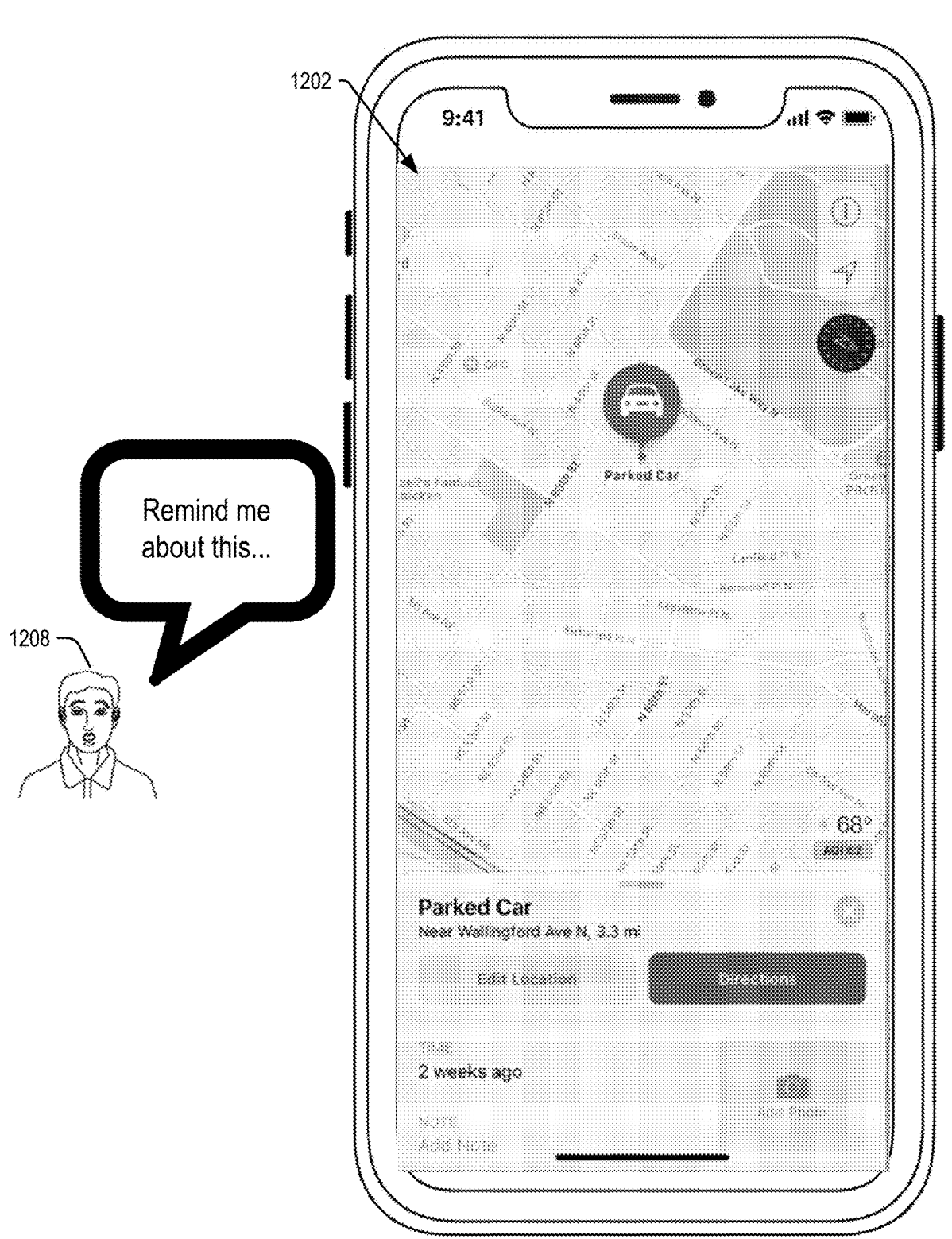
FIG. 12 is a block diagram of an example user interface for implementing the disclosed techniques, according to some embodiments.

FIG. 12 illustrates yet another example of using the state-tied reminder module 114 of FIG. 1. In this example, the user device 104 is displaying a map application 1202. However, instead of using a reminder generation UI element (e.g., like reminder generation UI element 1104 of FIG. 11), the user 1208 may begin the generation of the reminder via a voice command. For example, the user 1208 may speak something to the user device 104 that activates reminder generation (e.g., the user 1208 may speak "Remind me about this," which can trigger the state-tied reminder module 114 of FIG. 1. Much like the example of FIG. 11, the state of the user device 104 (e.g., the map application and/or the dropped pin (e.g., here the location of the user's parked car)) can be saved and associated with the reminder. In some instances, this feature can be supported by any application of the user device 104 that is capable of having its state captured and/or stored.

Figure 13:
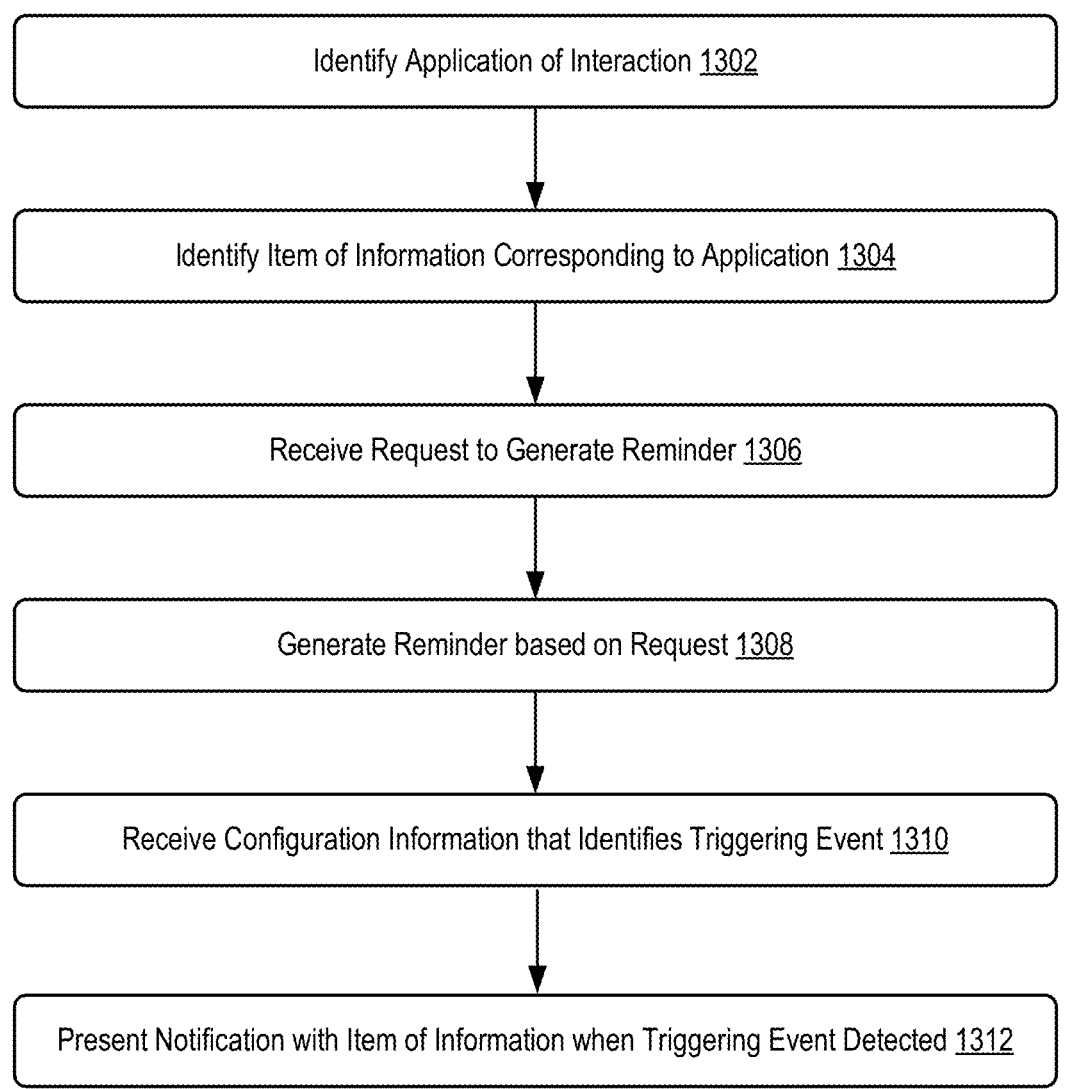
FIG. 13 is a flow diagram that details a process for implementing the disclosed techniques, according to some embodiments.

FIG. 13 is an example flow 1300 for implementing reminder generation techniques, in accordance with at least one embodiment where a reminder may be tied to an application or state information that identifies the application with which the user was interacting. It should be appreciated that the flow 1300 may include a greater number or a lesser number of operations than those depicted in FIG. 13 and that operations (e.g., the operations depicted in FIG. 13) may be performed in any suitable order. The operations of flow 1300 may be performed by the user device 104 of FIG. 1 or any computing device configured to provide such functionality (e.g., the wearable device 106 of FIG. 1), or any suitable combination of the two.

The flow 1300 may begin at 1302, where the user device 104 may identify an application with which a user is interacting. For example, the user may be interacting with a map application, a Web browser, a music streaming application, or the like.

At 1304, the user device 104 may identify an item of information corresponding to the application. For example, the item of information may identify the application and/or additional information about the application. That is, in some examples, the item of information may be the URL associated with the Web page being viewed, or the address or directions associated with the map application being viewed. In yet other instances, the item of information may include additional state information needed to execute returning the previous state.

At 1306, the user device 104 may receive a request to generate a reminder (e.g., based at least in part on the interaction of the user). As noted, the request may be made via tapping a UI element of a touch interface or it may be made via voice command.

At 1308, the user device 104 may generate a reminder based at least in part on the request. The reminder may include any attributes added to the reminder and/or the item of information. The reminder may also include a triggering event and/or notification parameters; although, in some examples, these are merely attributes.

At 1310, the user device 104 may receive configuration information that identifies the triggering event. As noted above, this may already be part of the attributes; however, in other instances, the user may add triggering event separately (i.e., after the reminder is generated).

At 1312, the user device 104 may present a notification that includes the item of information based at least in part on detection of the triggering event.

FIG. 14 is an example flow 1400 for implementing reminder generation techniques, in accordance with at least one embodiment where a reminder may be tied to an application or state information that identifies the application with which the user was interacting. It should be appreciated that the flow 1400 may include a greater number or a lesser number of operations than those depicted in FIG. 14 and that operations (e.g., the operations depicted in FIG. 14) may be performed in any suitable order. The operations of flow 1400 may be performed by the user device 104 of FIG. 1 or any computing device configured to provide such functionality (e.g., the wearable device 106 of FIG. 1), or any suitable combination of the two.

The flow 1400 may begin at 1402, where the user device 104 may receive a request to generate a reminder corresponding to a user's interaction with the user device 104. For example, the user may be interacting with an application, and may request that a reminder be generated that corresponds to the application or information that is part of or otherwise displayed by the application.

At 1404, the user device 104 may identify state information of the user device. In particular, the state information may correspond directly the application with which the user is interacting. For example, the state information that identified does not need to include information about general memory, background processing, or other applications that may also be running. In other words, the state information that is identified for generating a reminder about the user's interaction may be limited to state information that captures the state of the user interface and/or the user's interaction with the interface. However, in some examples, the additional state information may be needed. For example, if the user's interaction with a first application is dependent on some other application that is running in the background. If that is the case, the additional state information that identifies the state of the other application may be identified as well.

At 1406, the user device 104 may generate a reminder that includes the state information.

At 1408, the user device 104 may store the reminder with the corresponding state information. As such, when a notification of the reminder is presented, at least some of the state information can be presented to the user so they can select it, and be returned to the item, interaction, or application with which they were interacting.

Figure 15:
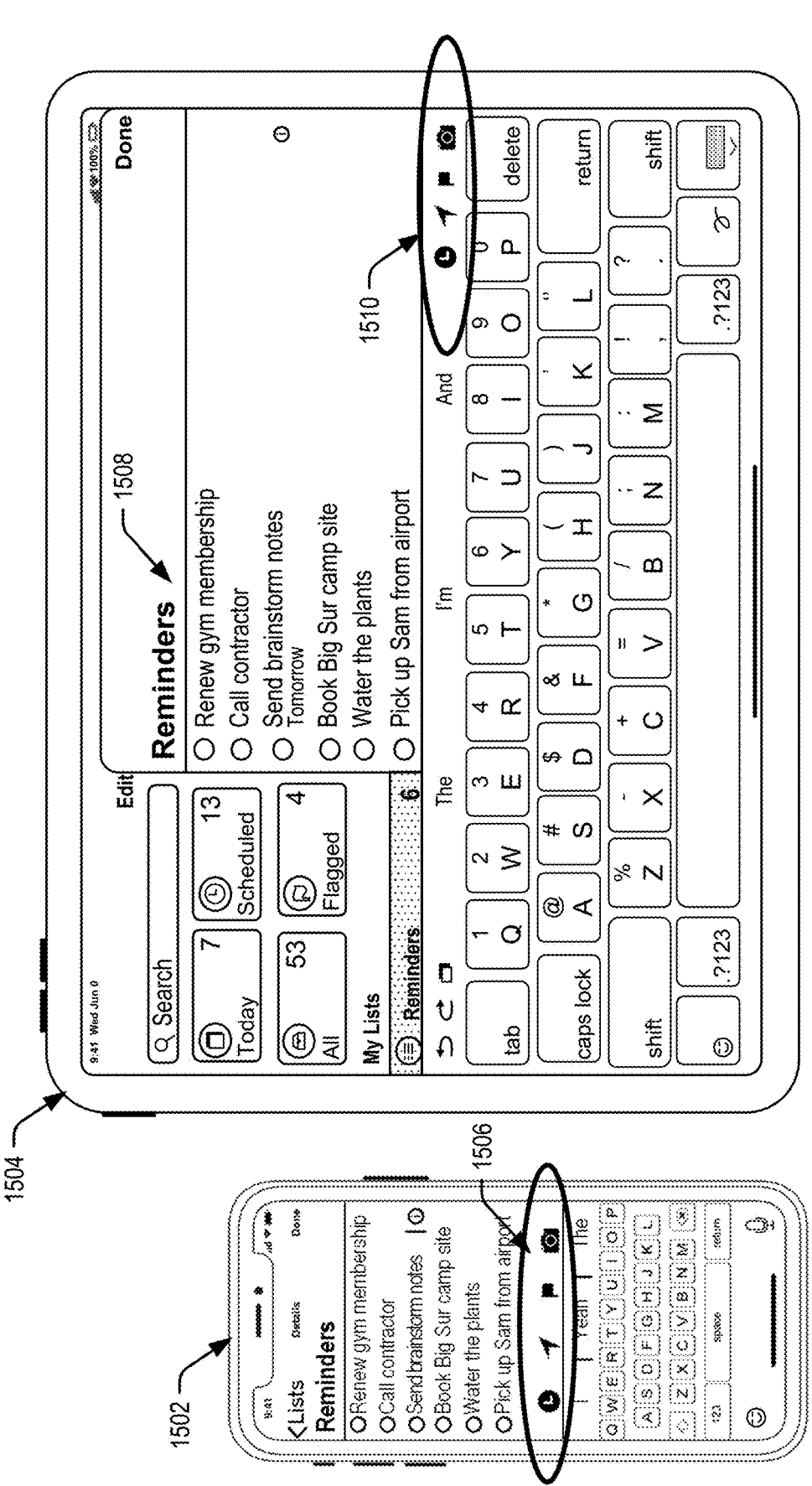
FIG. 15 is a block diagram of an example user interface for implementing the disclosed techniques, according to some embodiments.

FIG. 15 illustrates two example reminder UIs displayed by different form factor devices. For example, a reminders application UI is shown in a "list" view (e.g., a list UI) on user device (e.g., a smart telephone) 1502 and another version of the reminder UI is shown on a tablet-style device 1504.

In the first UI displayed by the user device 1502, a list of reminders can be seen. These reminders have already been generated; however, they may not have been fully configured yet. For example, they may not have any attributes assigned to them, in which case, they are just to-do list items that may not trigger a notification. Without attributes, the reminders application won't know when to notify the user about the reminder. As such, a quick bar 1506 of configuration UI elements may be provided below the list of reminders. In some examples, this quick bar 1506 can be presented next the list of reminders and can be used to configure already generated reminders. However, in other examples, the quick bar 1506 can be presented in the reminder generation UI, when a reminder is being created.

In the second UI displayed by the user device 1504, a list of reminders is also displayed in a "Reminders" UI portion 1508. In some examples, this portion 1508 may list all reminders. Additionally, adjacent to the reminders UI portion 1508, this reminders UI may present a set of auto-generated lists or categories for managing reminders. In this example, the "Today" list includes sever (7) reminders, the "Scheduled" list includes thirteen (13) reminders, etc. Below these auto-generated lists may also be other list UI elements that illustrate different lists or at least illustrates some of the lists in a different way. Again, as is illustrated on the user device 1502, this UI also includes a quick bar 1510 with similar functionality of quick bar 1506. Both quick bar 1506 and 1510 are configured with a time/date icon, a location icon, a flag icon, and an attachments/photo icon, which will be discussed in more detail below.

Figure 16:
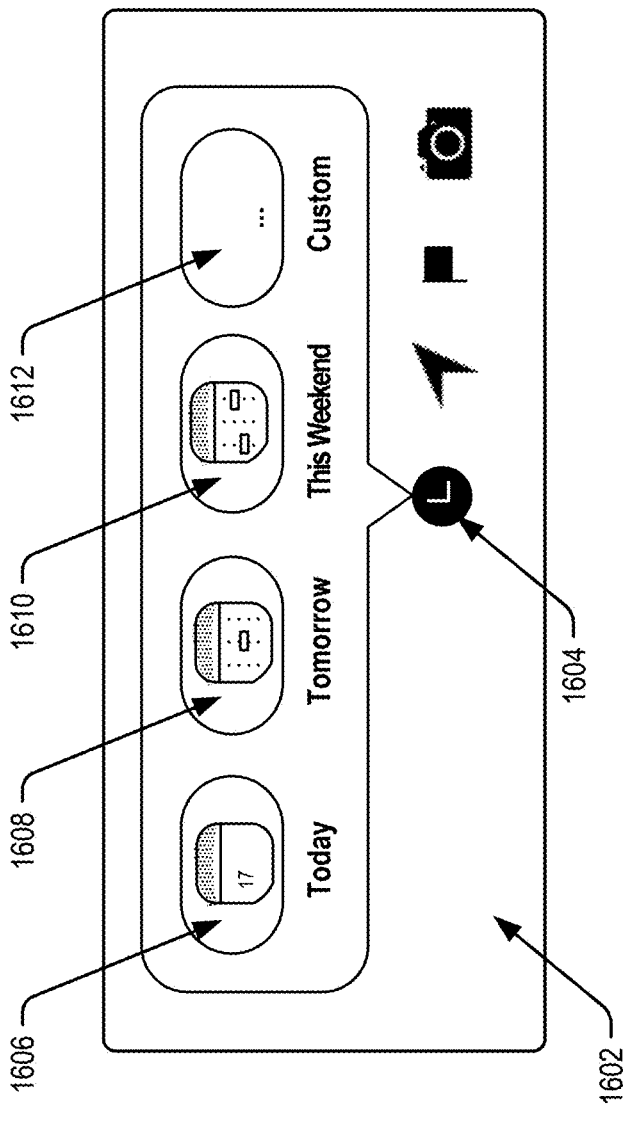
FIG. 16 is a block diagram of an example user interface for implementing the disclosed techniques, according to some embodiments.

FIG. 16 illustrates more details associated with a quick bar 1602 that can be used to configure a reminder. In this example, at least four different quick option UI elements are illustrated that can be presented when a user selects the time icon 1604 of the quick bar 1602. The quick option UI elements associated with the time icon 1604 are "today" 1606, "tomorrow" 1608, "this weekend" 1610, and "custom" 1612. As such, if a user wants a notification of a reminder to bet set for presentation on one of these given days, they can quickly and easily select the appropriate day. For example, if a user wants to be notified tomorrow about a certain reminder, they can select "tomorrow" 1608. However, in some examples, the "this weekend" 1610 option, may need to be revised to "next weekend" in order to avoid the "tomorrow" 1608 option and the "this weekend" 1610 option to provide the same setting. That is, on Friday or Saturday, tomorrow and this weekend will be the same. As such, the reminders application may be configured to determine the current day before rendering the quick bar 1602. If the current day is Friday or Saturday (e.g., weekend days for the sake of this example), then the quick bar 1602 will be adjusted so that the "this weekend" 1610 option will show "next weekend" instead. Alternatively, if the current day is a week day, then option 1610 will stay as "this weekend." Additionally, in some examples, selecting the "custom" 1612 option will cause presentation of an additional UI element that enables the user to select a date from a calendar.

Figure 17:
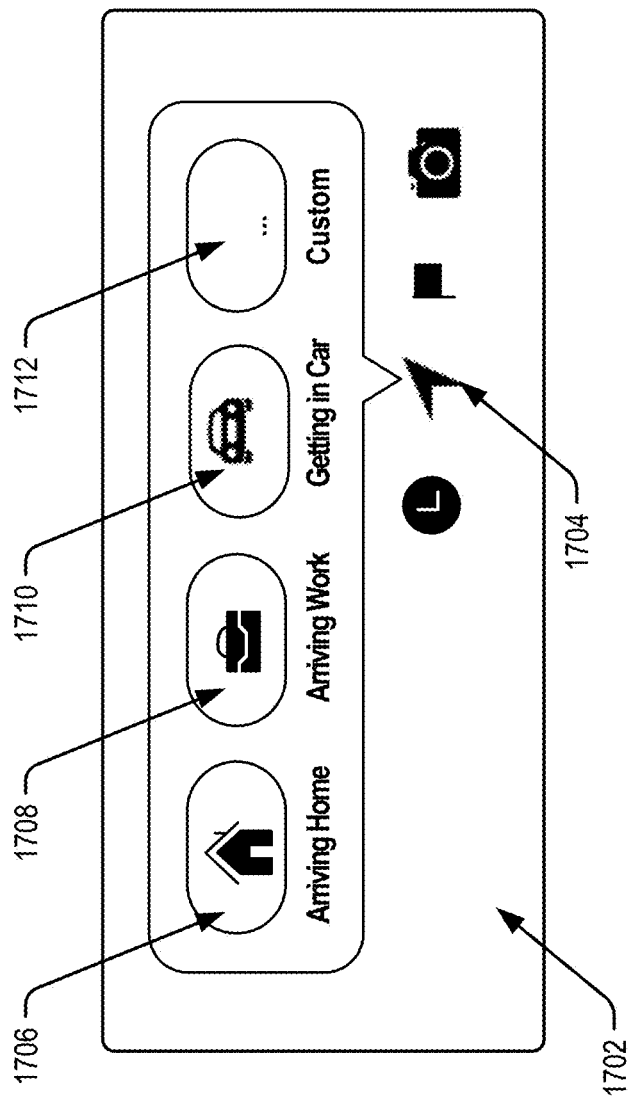
FIG. 17 is a block diagram of an example user interface for implementing the disclosed techniques, according to some embodiments.

FIG. 17 illustrates more details associated with a quick bar 1702 that can be used to configure a reminder. In this example, at least four different quick option UI elements are illustrated that can be presented when a user selects the location icon 1704 of the quick bar 1702. The quick option UI elements associated with the location icon 1704 are "arriving home" 1706, "arriving work" 1708, "getting in car" 1710, and "custom" 1712. As such, if a user wants a notification of a reminder to bet set for presentation based on one of these occurrences, they can quickly and easily select the appropriate triggering event. For example, if a user wants to be notified about a certain reminder when they get in their car, they can select "getting in car" 1710. However, in some example, the user device may be able to automatically determine whether the triggering event should be an "arriving" event or a "departing" event and may automatically configure that setting (or it may suggest the setting, and allow the user to confirm or decline). For example, if the user is at home when the reminder is being set, then "arriving home" 1706 option may be changed to "departing home," because it is more likely that the user wants to be reminded as they are leaving. Alternatively, if they are currently located at work, and the reminder location is home, the "arriving home" 1706 option may be appropriate, and nothing in the UI may be changed. However, in some examples, the logic for determining whether the options should offer "arriving" or "departing" may be executed before the quick bar is render, thus avoiding the need to change anything. Instead, the user device may detect the user's current location, identify the triggering event location setting as being the same location or a different location, and then generate/present the quick bar 1702 accordingly.

Figure 18:
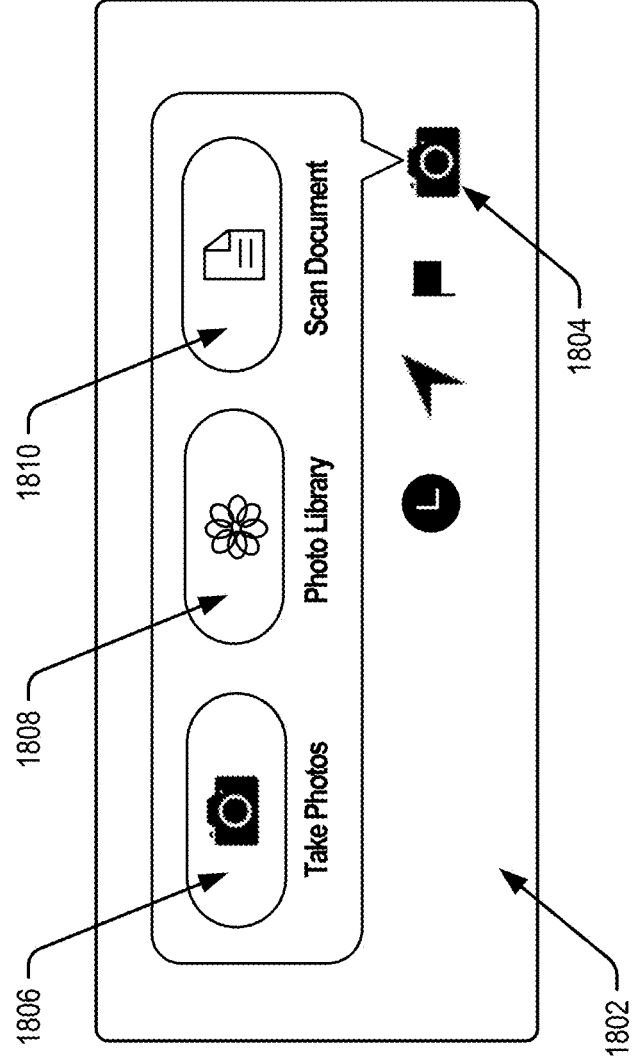
FIG. 18 is a block diagram of an example user interface for implementing the disclosed techniques, according to some embodiments.

FIG. 18 illustrates more details associated with a quick bar 1802 that can be used to configure a reminder. In this example, at least three different quick option UI elements are illustrated that can be presented when a user selects the photo icon 1804 of the quick bar 1802. The quick option UI elements associated with the photo icon 1804 are "take photos" 1806, "phot library" 1808, and "scan document" 1810. As such, if a user wants to attach a photo or other document to the reminder, they can quickly and easily select the appropriate option.

Figure 19:
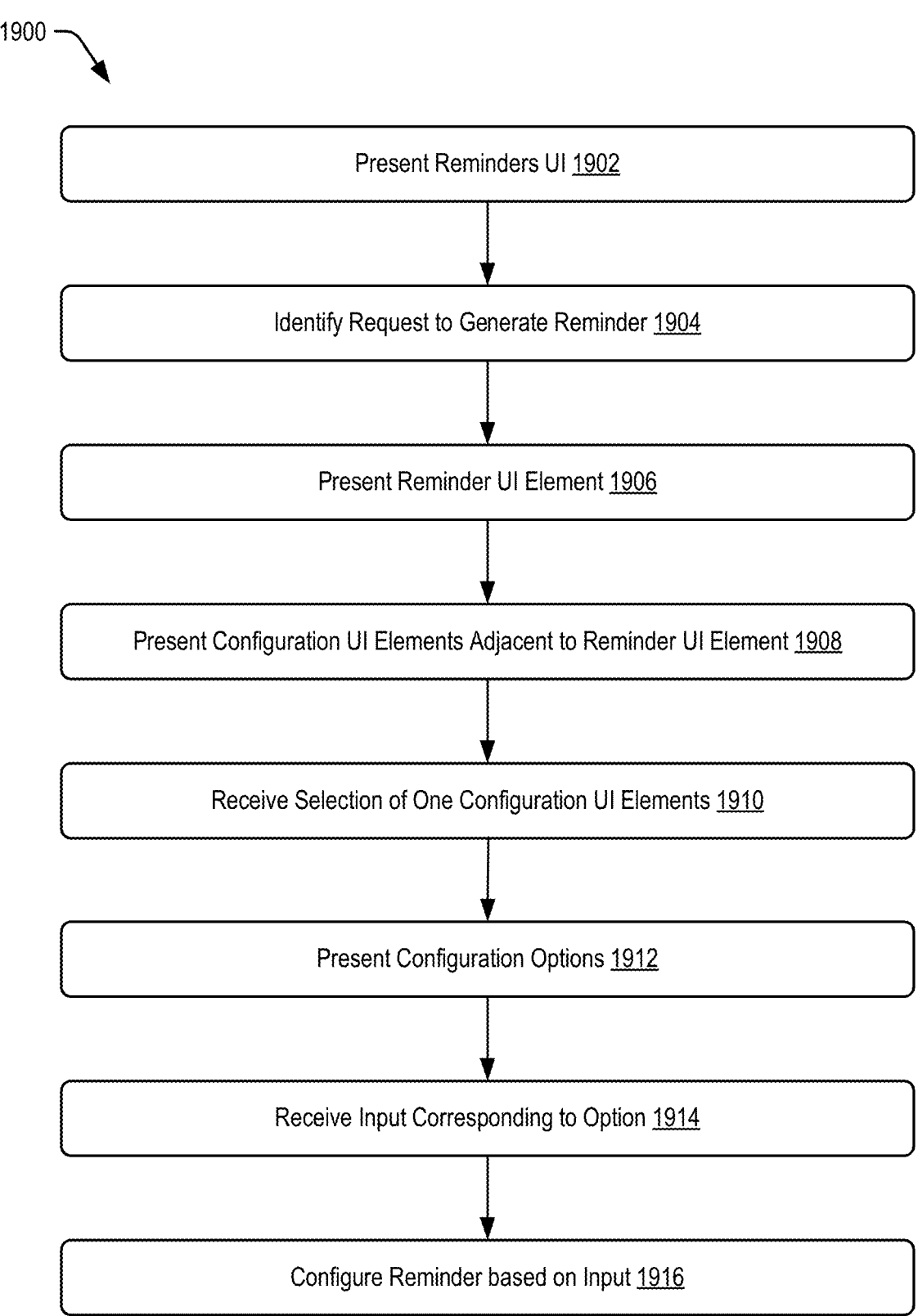
FIG. 19 is a flow diagram that details a process for implementing the disclosed techniques, according to some embodiments.

FIG. 19 is an example flow 1900 for implementing reminder generation techniques, in accordance with at least one embodiment where a reminder may be configured using dynamic configuration UI elements. It should be appreciated that the flow 1900 may include a greater number or a lesser number of operations than those depicted in FIG. 19 and that operations (e.g., the operations depicted in FIG. 19) may be performed in any suitable order. The operations of flow 1900 may be performed by the user device 104 of FIG. 1 or any computing device configured to provide such functionality (e.g., the wearable device 106 of FIG. 1), or any suitable combination of the two.

The flow 1900 may begin at 1902, where the user device 104 present a reminders UI. The reminders UI may be configured to render one or more reminders, lists of reminders, groups of reminders and/or groups lists, configuration options, and/or reminder generation tools.

At 1904, the user device 104 may identify a request to generate a reminder. The request may be received as a user input (e.g., a tap on a touch screen, a long press, a hard press, etc.), or it may be received as a voice command.

At 1906, the user device 104 may present a reminder UI element. In some instances, the reminder UI element is a specific UI representation of a reminder that can be displayed in the reminders UI. In some embodiments, FIG. 6 is an example of a reminder UI element. However, variations to the look and feel of this UI exist, and any UI element that displays at least the title of the new reminder could be a reminder UI element.

At 1908, the user device 104 may present one or more configuration UI elements. These configuration UI elements can be represented as the quick bars illustrated in FIGS. 15-18. The configuration UI elements can be presented adjacent to the reminder UI element.

At 1910, the user device 104 may receive selection of one of the configuration UI elements.

At 1912, the user device 104 may present the appropriate configuration options for the selected configuration UI element. For example, if the selected configuration UI element was the photo icon, the options noted in FIG. 18 would be the appropriate configuration options to be presented at 1912.

At 1914, the user device 104 may receive input that corresponds to one of the options.

At 1916, the user device 104 may configure the reminder based at least in part on the input received at 1914. However, as noted, in some examples, some of the configuration settings can be automatic. For example, the user's location and triggering location are known, a determination and automatic selection of whether the location should be an "arrival" location or a "departure" location may be made. In this case, the user may not need to select an option at 1914 and/or no option may be provided at 1912.

As described above, one aspect of the present technology is the gathering and use of data available from various sources to generate reminders from applications. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, date of birth, or any other identifying or personal information.

The present disclosure recognizes that the use of such personal information data, in the present technology, can be used to the benefit of users. For example, the personal information data can be used to deliver better reminders.

Accordingly, use of such personal information data enables users to receive reminders and/or notifications at a time and in a manner that may facilitate completion of a task. Thus, the personal information data discussed herein may aid the user in ensuring that a reminder is generated and/or the user is prompted to complete the task according to that particular user's schedule and daily activities.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of generating reminders from applications, the present technology can be configured to allow users to select to "opt in" or "opt out" of participation in the collection of personal information data (or some portion of their personal information data) during registration for services or anytime thereafter. In another example, users can select not to provide personal information data for the purposes of generating the reminders and/or notifications. In yet another example, users can select to limit the length of time personal information data is maintained or entirely prohibit the user of reminders and/or notifications that include or make use of the personal information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, reminders may be generated and/or delivered by inferring preferences based on non-personal information data or a bare minimum amount of personal information, such as the content being requested by the device associated with a user, other non-personal information available to the proactive reminders engine, or publicly available information.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the techniques to be practiced otherwise than as specifically described herein. Accordingly, these techniques include all modifications and equivalents of the subject matter recited in the claims appended hereto as permitted by applicable law. Moreover, any combination of the above-described elements in all possible variations thereof is encompassed by the disclosed techniques unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method, comprising:

receiving, by a first user device, information that identifies a second user device and an event;

generating, by the first user device, a reminder comprising the information that identifies the second user device and the event;

determining, by the first user device, whether the first user device is interacting with the second user device, the determination that the first user device is interacting with the second user device based at least in part on an electronic communication between the first user device and the second user device;

determining, by the first user device, a setting of the electronic communication between the first user device and the second user device; and in accordance with a determination that the first user device is interacting with the second user device and based at least in part on the setting of the electronic communication, causing, by the first user device, a third user device associated with the first user device to display a notification corresponding to the reminder, wherein the third user device is a mobile device.

2. The method of claim 1, wherein receiving the information that identifies the second user device and the event comprises:

receiving an indication of a contact from a contact list associated with the first user device; and identifying the second user device based at least in part on the indication of the contact.

3. The method of claim 1, further comprising:

receiving, by the first user device, an indication of a medium of interaction between the first user device and the second user device to cause the display of the notification, wherein generating the reminder comprises configuring the notification to be displayed based on interaction between the first user device and the second user device via the medium of interaction, wherein determining whether the first user device is interacting with the second user device includes determining whether the first user device is interacting with the second user device via the medium of interaction.

4. The method of claim 1, wherein the electronic communication comprises a text message, an instant message, or a phone call.

5. The method of claim 1, wherein the electronic communication comprises a telephone call between the first user device and the second user device, and wherein the method further comprises:

determining that a speaker of the first user device is turned on or that a headset is being used with the first user device; and presenting the notification on a screen of the first user device based at least in part on the determination that the speaker of the first user device is turned on or that the headset is being used with the first user device.

6. The method of claim 1, further comprising:

detecting, by the first user device, text entered into an application executing on the first user device; and determining, by the first user device, that the reminder is to be generated based at least in part on the detected text.

7. The method of claim 6, wherein receiving the information that identifies the second user device and the event comprises identifying at least a portion of the information from the text entered into the application.

8. The method of claim 1, wherein determining the setting of the electronic communication includes determining that a loud speaker of the first user device is turned off.

9. The method according to claim 1, wherein the third user device is a wearable device.

10. The method according to claim 1, wherein the reminder is generated based at least in part on contact information in a contacts list associated with the first user device.

11. One or more computer-readable media having instructions that, when executed by one or more processors of a first user device, configure the one or more processors to:

receive information that identifies a second user device and an event;

generate a reminder comprising the information that identifies the second user device and the event;

determine whether the first user device is interacting with the second user device, the determination that the first user device is interacting with the second user device based at least in part on an electronic communication between the first user device and the second user device;

determine a setting of the electronic communication between the first user device and the second user device; and in accordance with a determination that the first user device is interacting with the second user device and based at least in part on the setting of the electronic communication, cause a third user device associated with the first user device to display a notification corresponding to the reminder, wherein the third user device is a mobile device.

12. The one or more computer-readable media of claim 11, wherein the receipt of the information comprises:

receiving an indication of a contact from a contact list associated with the first user device; and identifying the second user device based at least in part on the indication of the contact.

13. The one or more computer-readable media of claim 11, wherein the one or more processors are further configured to:

receive an indication of a medium of interaction between the first user device and the second user device to cause the display of the notification, wherein the generation of the reminder comprises configuring the notification to be displayed based on interaction between the first user device and the second user device via the medium of interaction, wherein to determine whether the first user device is interacting with the second user device includes to determine whether the first user device is interacting with the second user device via the medium of interaction.

14. The one or more computer-readable media of claim 11, wherein the electronic communication comprises a telephone call between the first user device and the second user device, and wherein the one or more processors are further configured to:

determine that a speaker of the first user device is turned on or that a headset is being used with the first user device; and present the notification on a screen of the first user device based at least in part on the determination that the speaker of the first user device is turned on or that the headset is being used with the first user device.

15. The one or more computer-readable media of claim 11, wherein the one or more processors are further configured to:

detect text entered into an application executing on the first user device; and determine that the reminder is to be generated based at least in part on the detected text.

16. A first user device, comprising:

a communication connection that allows the first user device to communicate with a second user device; and one or more processors coupled to the communication connection, the one or more processors to:

receive information that identifies the second user device and an event;

generate a reminder comprising the information that identifies the second user device and the event;

determine whether the first user device is interacting with the second user device, the determination that the first user device is interacting with the second user device based at least in part on an electronic communication between the first user device and the second user device;

determine a setting of the electronic communication between the first user device and the second user device; and in accordance with a determination that the first user device is interacting with the second user device and based at least in part on the setting of the electronic communication, cause a third user device associated with the first user device to display a notification corresponding to the reminder, wherein the third user device is a mobile device.

17. The first user device of claim 16, wherein the receipt of the information that identifies the second user device and the event comprises:

receiving an indication of a contact from a contact list associated with the first user device; and identifying the second user device based at least in part on the indication of the contact.

18. The first user device of claim 16, wherein the one or more processors are further to:

receive an indication of a medium of interaction between the first user device and the second user device to cause the display of the notification, wherein generating the reminder comprises configuring the notification to be displayed based on interaction between the first user device and the second user device via the medium of interaction, wherein to determine whether the first user device is interacting with the second user device includes to determine whether the first user device is interacting with the second user device via the medium of interaction.

19. The first user device of claim 16, wherein the one or more processors are further to:

detect text entered into an application executing on the first user device; and determine that the reminder is to be generated based at least in part on the detected text.

20. The first user device of claim 19, wherein the receipt of the information that identifies the second user device and the event comprises identifying at least a portion of the information from the text entered into the application.

* * * * *